US012715213B2

(12) United States Patent
Ohshima

(10) Patent No.: US 12,715,213 B2

(45) Date of Patent: Aug. 25, 2026

(54) LIQUID DISCHARGE HEAD, LIQUID DISCHARGE UNIT, AND LIQUID DISCHARGE APPARATUS

(71) Applicant: Hisayoshi Ohshima, Kanagawa (JP)

(72) Inventor: Hisayoshi Ohshima, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 89 days.

(21) Appl. No.: 18/540,912

(22) Filed: Dec. 15, 2023

(65) Prior Publication Data

US 2024/0198673 A1 Jun. 20, 2024

(30) Foreign Application Priority Data

Dec. 16, 2022 (JP) ................................ 2022-201583

(51) Int. Cl.
*B41J 2/14* (2006.01)

(52) U.S. Cl.
CPC ......... *B41J 2/14201* (2013.01); *B41J 2/1429* (2013.01); *B41J 2002/14225* (2013.01); *B41J 2202/05* (2013.01)

(58) Field of Classification Search
CPC .................. B41J 2/14201; B41J 2/1429; B41J 2002/14225; B41J 2202/05
See application file for complete search history.

(56) References Cited

U.S. PATENT DOCUMENTS

| | | | | |
|---|---|---|---|---|
| 4,203,554 | A * | 5/1980 | Zimmer | B05B 15/18 68/205 R |
| 5,356,034 | A * | 10/1994 | Schlumberger | B01J 4/02 222/61 |
| 2022/0310899 | A1 | 9/2022 | Miyazawa et al. | |
| 2022/0379609 | A1 * | 12/2022 | Matsufuji | B41J 2/14201 |
| 2023/0294412 | A1 | 9/2023 | Kurosawa et al. | |
| 2023/0373214 | A1 | 11/2023 | Kawakami et al. | |

FOREIGN PATENT DOCUMENTS

| | | | |
|---|---|---|---|
| JP | 2018-138788 | A | 9/2018 |
| JP | 2021-151767 | A | 9/2021 |
| WO | 2019/063136 | A1 | 4/2019 |

* cited by examiner

*Primary Examiner* — Geoffrey S Mruk
(74) *Attorney, Agent, or Firm* — XSENSUS LLP

(57) ABSTRACT

A liquid discharge head includes: a nozzle hole from which a liquid is dischargeable in a discharge direction; a liquid chamber in communication with the nozzle hole; a needle valve movable in the discharge direction to be separatable from or contactable with the nozzle hole to open or close the nozzle hole; a driver to move the needle valve in the discharge direction; a housing having: the liquid chamber; and a housing chamber housing the needle valve and the driver; and a sheet member having a shape of a sheet and a flexibility to deform in the discharge direction, the sheet member including: an inner circumference fitted to an outer circumference of the needle valve; and a rim secured to the housing.

20 Claims, 24 Drawing Sheets

LIQUID DISCHARGE HEAD, LIQUID DISCHARGE UNIT, AND LIQUID DISCHARGE APPARATUS

CROSS-REFERENCE TO RELATED APPLICATION

This patent application is based on and claims priority pursuant to 35 U.S.C. § 119(a) to Japanese Patent Application No. 2022-201583, filed on Dec. 16, 2022, in the Japan Patent Office, the entire disclosure of which is hereby incorporated by reference herein.

BACKGROUND

Technical Field

The present embodiment relates to a liquid discharge head, a liquid discharge unit, and a liquid discharge apparatus.

Related Art

An applicator discharges, with a slidable valve needle that opens/shuts a nozzle, a coating agent in a droplet manner from a nozzle chamber. The applicator includes a sealing member that fluidically separates an actuator chamber and the nozzle chamber housing the coating agent, in which the actuator chamber houses an actuator that displaces the valve needle, and the sealing member serves as a sealing film shaped like a continuous film.

SUMMARY

In an aspect of the present disclosure, a liquid discharge head includes: a nozzle hole from which a liquid is dischargeable in a discharge direction; a liquid chamber in communication with the nozzle hole; a needle valve movable in the discharge direction to be separatable from or contactable with the nozzle hole to open or close the nozzle hole; a driver to move the needle valve in the discharge direction; a housing having: the liquid chamber; and a housing chamber housing the needle valve and the driver; and a sheet member having a shape of a sheet and a flexibility to deform in the discharge direction, the sheet member including: an inner circumference fitted to an outer circumference of the needle valve; and a rim secured to the housing, wherein the sheet member is between the needle valve and the housing in a transverse direction orthogonal to the discharge direction to restrict a position of the needle valve in the transverse direction.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
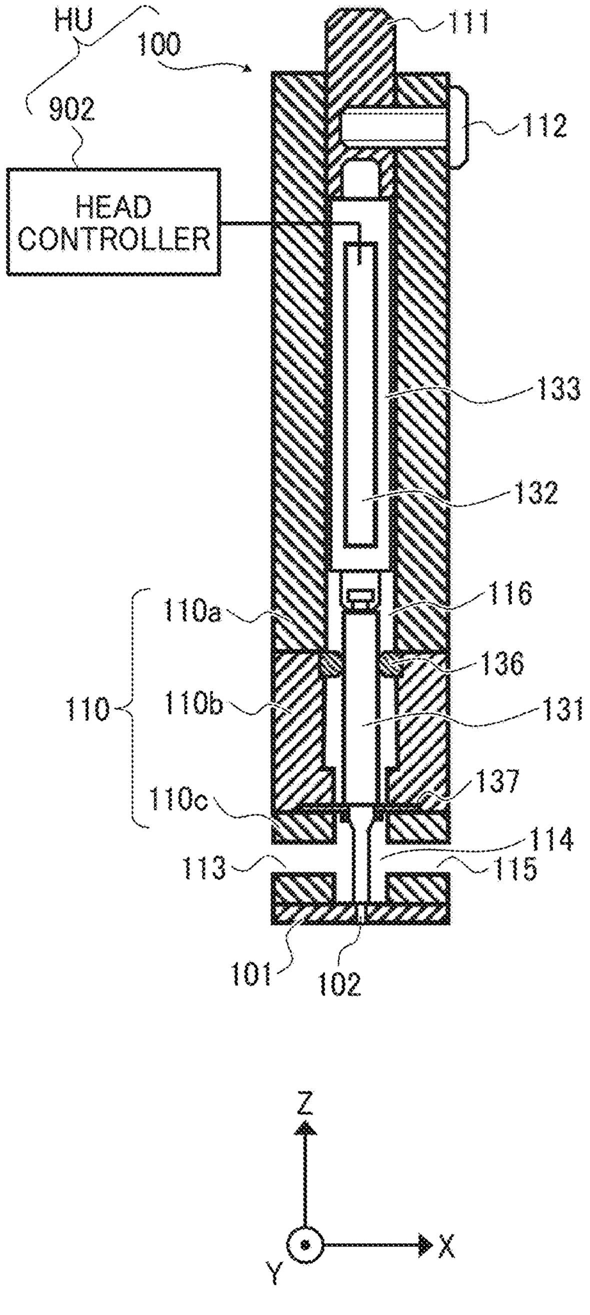
FIG. 1 is a schematic cross-sectional view of an exemplary head unit according to an embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present embodiment will be described below with reference to the drawings. For description of the drawings, the same constituent elements are denoted with the same reference signs and duplicate descriptions thereof will be omitted. Note that the present embodiment is not limited to the following embodiments and thus other embodiments, additions, modifications, and deletions can be made within a scope conceivable by persons skilled in the art. Any aspects that achieve the function and effect of the present embodiment are to be included in the scope of the present embodiment.

Head Unit

Figure 2:
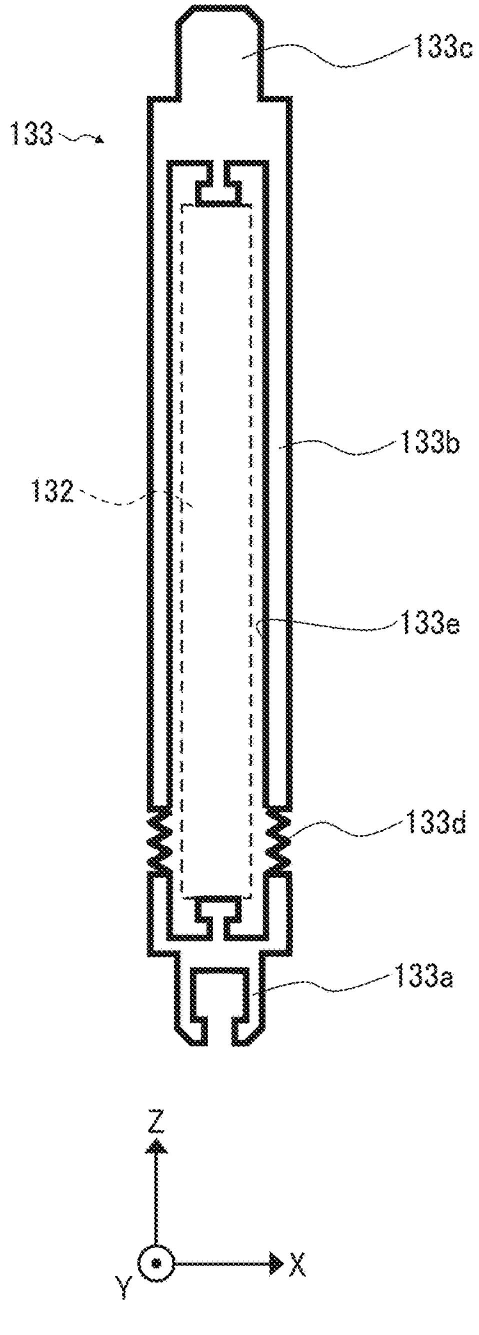
FIG. 2 is a schematic view of the configuration of an exemplary holding member.
Figure 3:
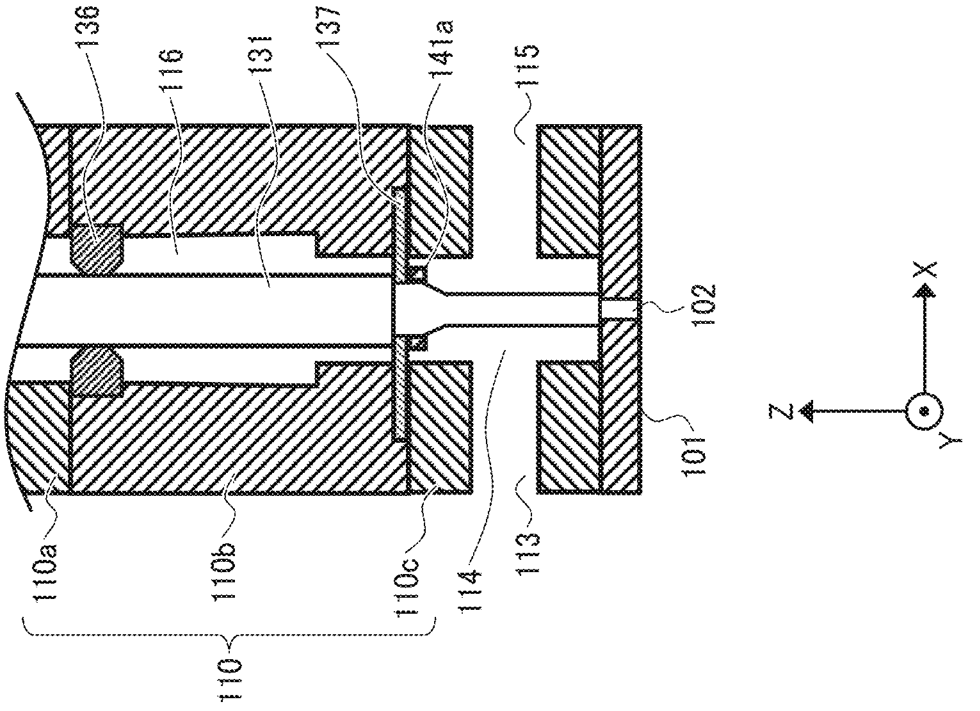
FIG. 3 is a schematic cross-sectional view of main parts according to a first embodiment.

A head unit will be described with FIGS. 1 to 3. FIG. 1 is a schematic cross-sectional view of an exemplary head unit according to an embodiment and illustrates the configuration of a head minimum unit (with a single nozzle).

The head unit exemplified in FIG. 1 serves as ahead unit that discharges coating material as exemplary liquid. Ahead unit HU includes ahead 100 as an exemplary liquid discharge head and ahead controller 902 that controls the driving of the head 100. The head controller 902 is an exemplary driving controller.

Each of the functions of the described embodiments such as the head controller 902 may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The head 100 includes a housing 110 that is hollow and a nozzle plate 101 with which the housing 110 has an end provided. The nozzle plate 101 is a tabular member having a nozzle hole 102 for discharging coating material in a discharge direction that is downward direction in FIG. 8B.

The housing 110 has a side face, closer to the nozzle hole 102, having a supply port 113 for supplying coating material and a discharge port 115 for discharging coating material. The coating material supplied to the supply port 113 is fed to a liquid chamber 114 in the housing 110. Simultaneously with the supply of coating material to the supply port 113, the air or surplus coating material in the liquid chamber 114 is discharged outward through the discharge port 115. After the liquid chamber 114 is filled with coating material, the discharge port 115 is shut, for example, by a valve. As a brief description, the liquid chamber 114 corresponds to the space between the nozzle plate 101 and a sealing/positional restraint film 137 in the housing 110.

Part of a needle valve 131 is disposed in the liquid chamber 114. Although a support structure for such a needle valve 131 will be described later, as a brief description, the needle valve 131 has an end (upper end in FIG. 1), on the side opposite to the side on which the needle valve 131 faces the nozzle hole 102, held by a holding member 133 and has an outer circumference supported by the sealing/positional restraint film 137 and a bearing 136. The sealing/positional restraint film 137 has a function of restricting the posture of the needle valve 131 (slanting in the XY directions) and additionally has a sealing function, preventing the coating material in the liquid chamber 114 from flowing into a housing chamber 116.

The sealing/positional restraint film 137 is referred also as a "sheet member".

The sealing/positional restraint film 137 (sheet member) is between the liquid chamber 114 and the housing chamber 116 to seal the housing chamber 116 from the liquid in the liquid chamber 114.

Referring to FIG. 1, the housing chamber 116 corresponds to the space opposite the liquid chamber 114 across the sealing/positional restraint film 137. In the present embodiment, the housing chamber 116 houses, for example, the needle valve 131, a piezoelectric element 132, the holding member 133, and the bearing 136.

The housing chamber 116 is provided with the piezoelectric element 132 as an exemplary driver through the holding member 133. In response to a driving signal from the head controller 902, the piezoelectric element 132 causes the needle valve 131 to move for separation from or contact with the nozzle plate 101 such that the nozzle hole 102 is open or shut. With the nozzle hole 102 open, the needle valve 131 has its leading end away from the nozzle plate 101. With the nozzle hole 102 shut, the needle valve 131 has its leading end abutting on the nozzle plate 101. For example, the piezoelectric element 132 is formed of zirconia ceramic. For example, the piezoelectric element 132 has a shape set appropriately in accordance with the amount of a droplet to be discharged from the nozzle hole 102.

The housing 110 includes a fixed shaft 11 located facing the upper end of the holding member 133. The fixed shaft 111 abuts on the upper end of the holding member 133 and is additionally secured to the housing 110 with a fastening screw 112, forming a fixed point. That is, because of the provision of the fixed point, displacement in the Z direction due to extension/contraction of the piezoelectric element 132 occurs on the side of location of the needle valve 131.

The head controller 902 is electrically connected to the piezoelectric element 132 and controls the driving of the piezoelectric element 132.

Note that the housing 110 is not limited to having a single housing structure and thus may have a split structure in which multiple sub-housings is provided, considering assembly performance of the head 100. For example, the housing 110 in the head 100 illustrated in FIG. 1 includes three sub-housings (a first housing 110*a*, a second housing 110*b*, and a third housing 110*c*). The first housing 110*a* houses mainly the piezoelectric element 132. The second housing 110*b* houses mainly the needle valve 131. The third housing 110*c* forms mainly a channel for coating material and additionally supports the nozzle plate 101.

Next, the configuration of the holding member 133 that holds the piezoelectric element 132 in the housing 110 will be described. FIG. 2 is a schematic view of the configuration of an exemplary holding member.

The holding member 133 is tabular as a whole and includes a needle-valve holder 133*a*, a frame 133*b*, a fixed-shaft abutment 133*c*, an elastic member 133*d*, and a space 133*e*. The needle-valve holder 133*a* is shaped such that the upper end of the needle valve 131 can be held as illustrated in FIG. 1 and holds the needle valve 131. The frame 133*b* is coupled to the needle-valve holder 133*a* through the elastic member 133*d*, forming the space 133*e* inside. The fixed-shaft abutment 133*c* protrudes outward from the upper end of the frame 133*b*. The fixed-shaft abutment 133*c* abuts on the fixed shaft 111 as illustrated in FIG. 1, serving as a fixed point for restricting movement in the Z direction of the holding member 133.

The elastic member 133*d* couples the needle-valve holder 133*a* and the frame 133*b* and additionally functions as a spring that urges the needle-valve holder 133*a* toward the frame 133*b* (positively in the Z direction).

The space 133*e* is located inside the needle-valve holder 133*a* and the frame 133*b*. As indicated with a dashed line, the piezoelectric element 132 is installed in the space 133*e*. Because the spring force of contraction of the elastic member 133*d* serves as holding force, the piezoelectric element 132 installed in the space 133*e* is nipped and held between the inside of the needle-valve holder 133*a* and the inside of the frame 133*b*.

According to the above configuration, the needle valve 131 and the piezoelectric element 132 are disposed coaxially through the holding member 133, namely, in series in the direction of liquid discharging. Then, in response to contraction of the piezoelectric element 132 due to application of a driving voltage (open voltage) to the piezoelectric element 132, the needle-valve holder 133*a* moves positively in the Z direction while being drawn by the elastic member 133*d*. Thus, due to driving of the piezoelectric element 132, the holding member 133 deforms elastically to transmit the driving force of the piezoelectric element 132 to the needle valve 131. Thus, the needle valve 131 moves away from the nozzle plate 101 to open the nozzle hole 102, so that the coating material in the liquid chamber 114 is discharged through the nozzle hole 102.

In response to extension of the piezoelectric element 132 due to application of a driving voltage (shut voltage) to the piezoelectric element 132, the needle-valve holder 133*a* moves negatively in the Z direction against the spring force of the elastic member 133*d*. Thus, the needle valve 131 abuts on the nozzle plate 101 to shut the nozzle hole 102, so that the discharging of the coating material through the nozzle hole 102 stops.

Note that, for the holding member 133, the needle-valve holder 133*a*, the frame 133*b*, the fixed-shaft abutment 133*c*, and the elastic member 133*d* may be provided as a single member. Part of the needle-valve holder 133*a*, the frame 133*b*, the fixed-shaft abutment 133*c*, and the elastic member 133*d* may be formed of a different member. For example, the elastic member 133*d* may be formed of a different member such as a spring, and such a spring may be attached to the needle-valve holder 133*a* and the frame 133*b*. Alternatively, the elastic member 133*d* may be integrally formed with the needle-valve holder 133*a* and the frame 133*b*.

First Embodiment

Next, a support structure for a needle valve 131 will be described with FIG. 3. FIG. 3 is a schematic cross-sectional view of main parts according to a first embodiment.

In the first embodiment, a housing 110 includes three sub-housings, namely, a first housing 110*a*, a second housing 110*b*, and a third housing 110*c*. A needle valve 131 is supported in a housing chamber 116 by a sealing/positional restraint film 137 with which the second housing 110*b* has, in the Z direction, an end provided and a bearing 136 with which the second housing 110*b* has, in the Z direction, the other end provided. The sealing/positional restraint film 137 is an exemplary positional restraint member and is also an exemplary first positional restraint member. The bearing 136 is an exemplary second positional restraint member.

The sealing/positional restraint film 137 serves as a sheet-shaped member including a single layer or multiple layers flexible in the direction in which the needle valve 131 moves for separation or contact (Z direction). The sealing/positional restraint film 137 has an inner circumference that fits the outer circumference of the needle valve 131 and a rim that is secured to the housing 110.

Although the inner circumference and rim of the sealing/positional restraint film 137 will be described later, as a brief description, in a case where the cross section on the XY plane of the needle valve 131 is circular in shape, the inner circumference of the sealing/positional restraint film 137 corresponds to a circular hole that fits the needle valve 131. In the present embodiment, the rim of the sealing/positional restraint film 137 corresponds to a part nipped between the second housing 110*b* and the third housing 110*c*.

For example, the second housing 110*b* has a recess, of which the depth is less than the thickness of the sealing/positional restraint film 137, at its part facing the rim of the sealing/positional restraint film 137.

The sealing/positional restraint film 137 located on the recess is secured to the housing 110 due to compression of the rim of the sealing/positional restraint film 137 between the second housing 110*b* and the third housing 110*c* based on joining of the housings 110*a*, 110*b*, and 110*c*.

A press member 141*a* is fitted to the needle valve 131 extending downward through the sealing/positional restraint film 137. The press member 141*a* thrusts the sealing/positional restraint film 137, for example, against a step with which the needle valve 131 is provided.

As above, the position of the needle valve 131 is restricted by the bearing 136 and the sealing/positional restraint film 137 in a transverse direction (XY direction) orthogonal to the discharge direction in which the needle valve 131 moves to be separated from or contact with a nozzle plate 101 (Z direction).

The needle valve 131 is supported in the housing chamber 116. Due to its tensile balance, the sealing/positional restraint film 137 has a positional restraint function for restricting the position in the XY directions of the needle valve 131 to the housing 110 and additionally has a sealing function for preventing the coating material supplied to a liquid chamber 114 from entering the housing chamber 116.

Since the bearing 136 is located away opposite the liquid chamber 114 across the sealing/positional restraint film 137 in the Z direction, the bearing 136 restricts the position of the needle valve 131 in the transverse directions (XY directions) orthogonal to the discharge direction in which the needle valve 131 moves for separation or contact. Thus, the needle valve 131 can be accurately restricted from positional misalignment (core misalignment) with respect to the nozzle hole 102 of the nozzle plate 101 or from slanting to the nozzle plate 101.

Figure 4:
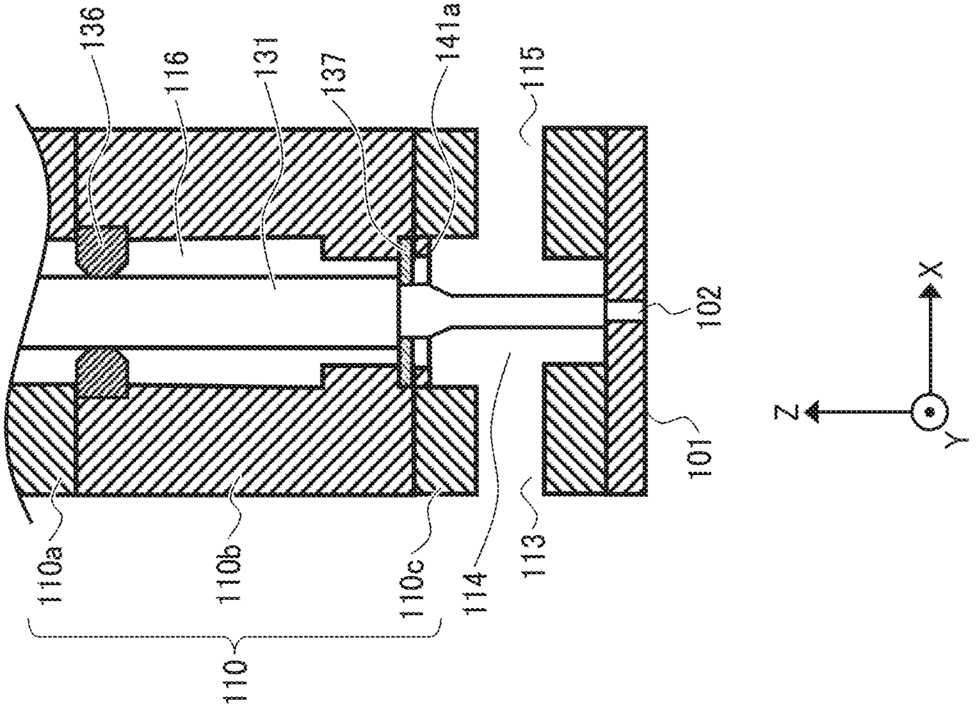
FIG. 4 is a schematic cross-sectional view of main parts in a method for securing a positional restraint member according to a modification.

A method for securing the sealing/positional restraint film 137 to the housing 110 is not limited to nipping the rim of the sealing/positional restraint film 137 between the second housing 110*b* and the third housing 110*c*. For example, as illustrated in FIG. 4, a sealing/positional restraint film 137, a press member 141*a*, and an opening that a second housing 110*b* has and that extends from the side of location of a liquid chamber 114 to the side of location of a housing chamber 116 may be provided in the same size. In this case, the sealing/positional restraint film 137 is secured while being thrusted against the second housing 110*b* by the press member 141*a*, instead of being nipped between two sub-housings.

Configuration of Pressurizing Supply Mechanism and Moving Mechanism

Figure 5:
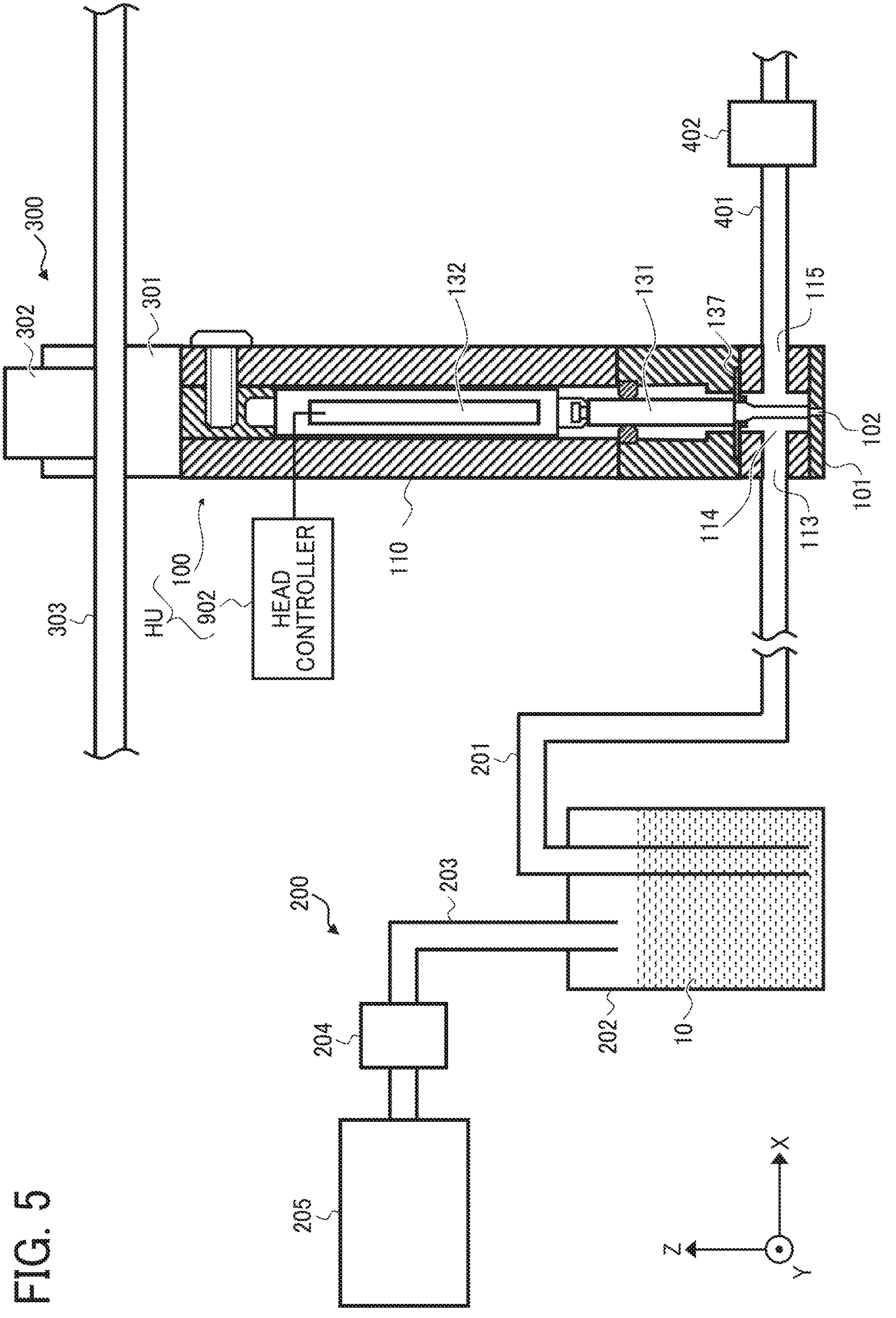
FIG. 5 is an explanatory view of an exemplary pressurizing supply mechanism and an exemplary head moving mechanism.

Next, a pressurizing supply mechanism that supplies pressurized coating material to the head 100 and a moving mechanism that moves the head 100 will be described with FIGS. 5 to 7. FIG. 5 is an explanatory view of an exemplary pressurizing supply mechanism and an exemplary moving mechanism.

Referring to FIG. 5, coating material 10 to be discharged from the head 100 is housed in a coating-material tank 202 that is enclosed. The coating-material tank 202 and the supply port 113 of the head 100 are coupled through a coating-material supply channel 201.

Meanwhile, the coating-material tank 202 is coupled to a compressor 205 through a pressurized-air supply channel 203 provided with an air regulator 204. The air regulator 204 adjusts the pressure of the compressed air generated by the compressor 205 to desired air pressure and then supplies the pressurized air from the compressor 205 to the coating-material tank 202. Thus, the supply port 113 of the head 100 is supplied with pressurized coating material 10 and then the coating material 10 is discharged through the nozzle hole 102 in response to opening/shutting of the needle valve 131. The coating-material supply channel 201, the coating-material tank 202, the pressurized-air supply channel 203, the air regulator 204, and the compressor 205 are an exemplary pressurizing supplier and function as a pressurizing supply mechanism 200 for supplying pressurized coating material 10 to the liquid chamber 114 of the head 100.

Referring to FIG. 5, part of the housing 110 of the head 100 (upper portion in FIG. 5) is attached to a head holding member 301 as an exemplary holder. The head holding member 301 is provided with a driving device 302. In response to driving of the driving device 302, the head holding member 301 can move positively in the X direction or negatively in the X direction along a rail 303. Thus, the head 100 attached to the head holding member 301 moves positively in the X direction or negatively in the X direction along the rail 303. The head holding member 301, the driving device 302, and the rail 303 are an exemplary mover and function as a head moving mechanism 300 for moving the head 100 to a coating target.

Note that, as the driving device 302 and the rail 303 in the head moving mechanism 300, a publicly known mechanism can be used, such as a feed screw mechanism including a ball screw, a rack-and-pinion feed mechanism, or a feed mechanism including a power transmission belt and a pulley. The head moving mechanism 300 is not limited to the above configuration. For example, the head holding member 301 may be mounted on a multi-joint robot arm such that the head 100 can freely move to a coating target.

A coating-material discharge channel 401 for feeding the coating material 10 discharged from the discharge port 115 outward is coupled to the discharge port 115 of the head 100. The coating-material discharge channel 401 is provided with a discharge valve 402 that restricts the flow rate of the coating material 10 in the coating-material discharge channel 401. For example, in filling the head 100 with coating material 10, air may be present in the coating-material supply channel 201 and in the liquid chamber 114 at the beginning. Thus, the discharge valve 402 remains open for a predetermined time after the start of filling of coating material 10. After the predetermined time elapses for removal of the air in the coating-material supply channel 201 and in the liquid chamber 114, the discharge valve 402 is shut. After that, the operation of discharging coating material 10 starts. Thus, during the operation of discharging coating material 10, the pressure applied by the pressurizing supply mechanism 200 hardly leaks outward, leading to a reduction in the load of the pressurizing supply mechanism 200.

Note that a path for coating material 10 may be provided such that the coating material 10 discharged from the discharge port 115 is returned to the supply port 113 and the coating material 10 is supplied to the liquid chamber 114 in circulation. In such a head configuration as above in which discharging operation is carried out with coating material in circulation, namely, in a flow-through type of head configuration, the discharge valve 402 is not necessarily shut after the predetermined time elapses, and thus the discharge valve 402 may be omitted.

In the present embodiment, a single coating-material tank 202 is coupled to a single head 100 as a configuration. However, as another configuration, multiple tanks may be coupled to a single head 100 and multiple types of coating material may be used with the single head 100. In such a case, for example, coating-material tanks each housing coating material different in color and a cleaning-liquid tank housing cleaning liquid are coupled to the coating-material supply channel 201. Furthermore, the coating-material supply channel 201 is provided with a valve similar in configuration to the discharge valve 402. The valve feeds the cleaning liquid to the liquid chamber 114 every time a change is made in the coating material to be used and makes a switch between the coating-material tanks and the cleaning-liquid tank such that the coating material to be used is fed to the liquid chamber 114 after the coating-material supply channel 201, the liquid chamber 114, and the coating-material discharge channel 401 are cleaned.

Figure 6:
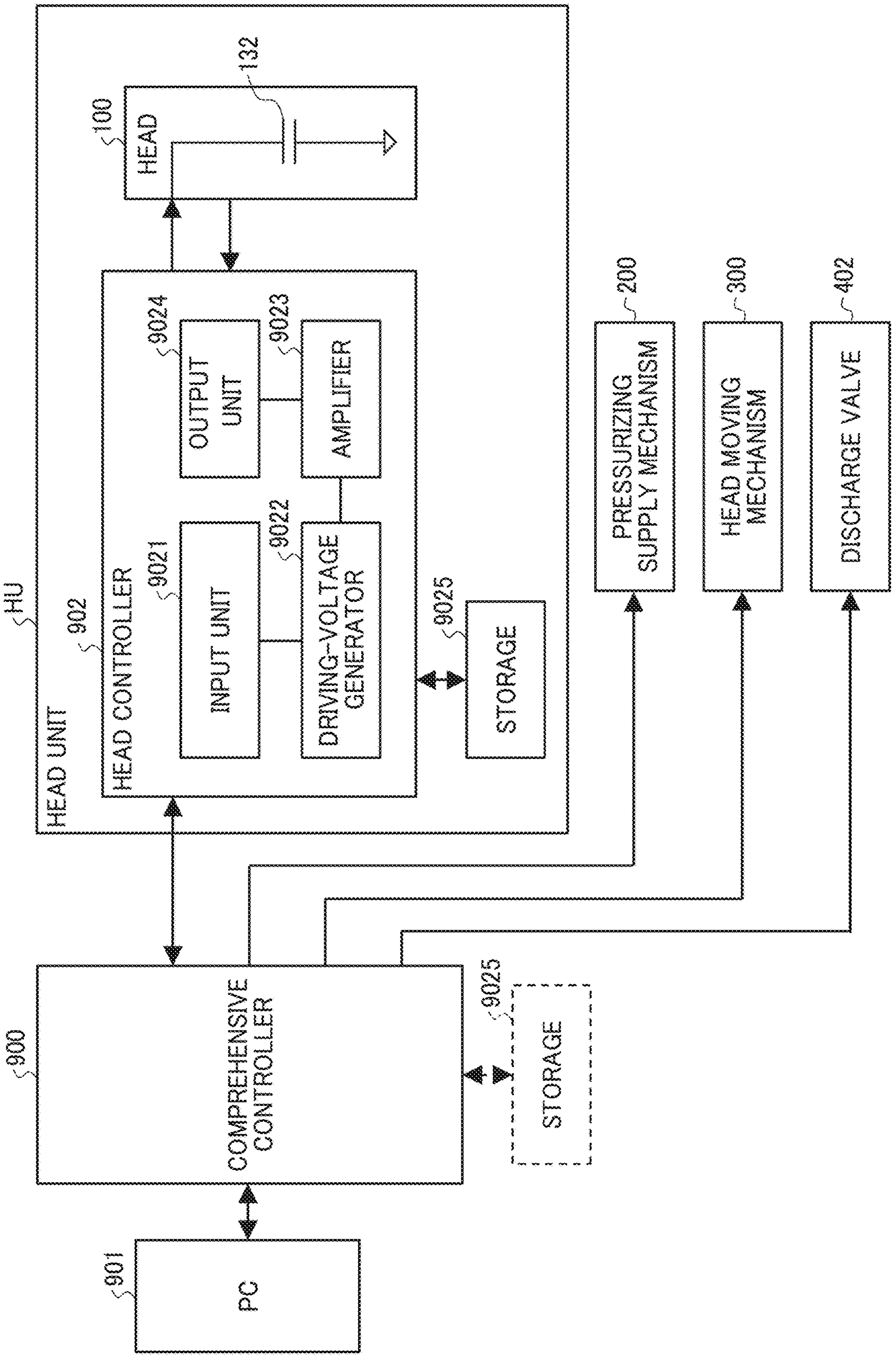
FIG. 6 is a block diagram of an exemplary control system for a head unit, a pressurizing supply mechanism, a head moving mechanism, and a discharge valve.
Figure 7:
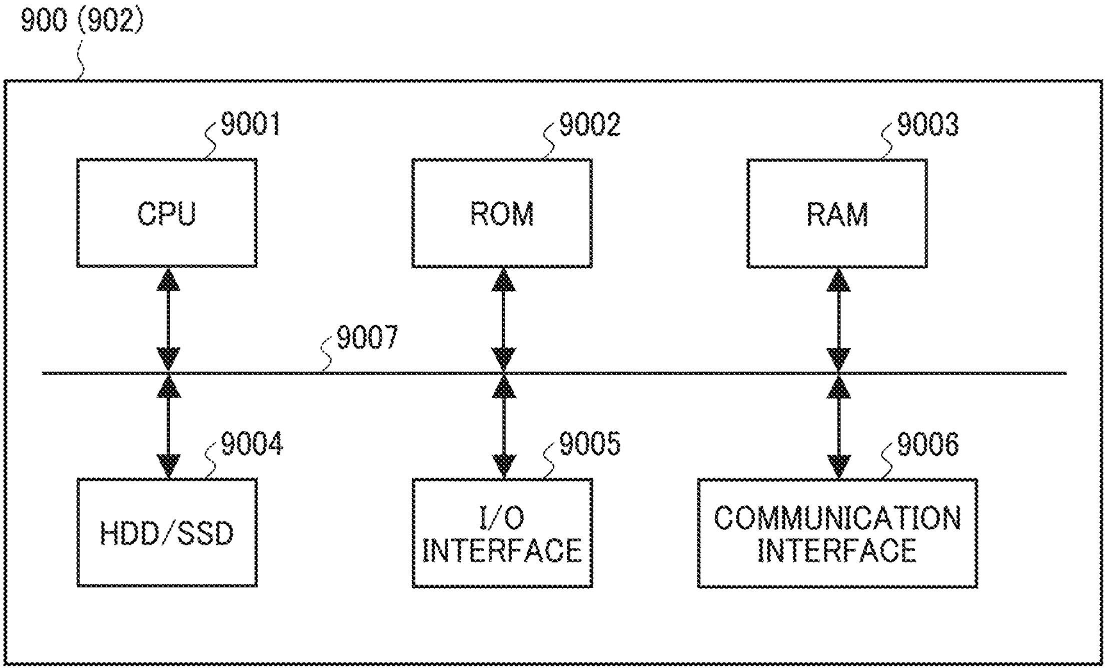
FIG. 7 is an explanatory diagram of an exemplary hardware configuration of a controller.

FIG. 6 is a block diagram of an exemplary control system for a head unit, a pressurizing supply mechanism, a head moving mechanism, and a discharge valve.

The head unit HU, the pressurizing supply mechanism 200, the head moving mechanism 300, and the discharge valve 402 are electrically connected to a comprehensive controller 900.

The comprehensive controller 900 may control the entire operation of a liquid discharge apparatus to be described later. In addition to the constituent elements illustrated in FIG. 6, as necessary, a constituent element may be added. For example, the comprehensive controller 900 transmits, to the head controller 902, a discharge cycle signal for discharging coating material based on image data. The comprehensive controller 900 receives, through the head controller 902, information regarding the state of operation of the head 100. The comprehensive controller 900 transmits, to the pressurizing supply mechanism 200, a switch signal for making a switch in the quantity of supply of pressurized air. The comprehensive controller 900 transmits, to the head moving mechanism 300, a moving signal for moving the head 100. Furthermore, the comprehensive controller 90 transmits, to the discharge valve 402, a discharge-valve open/shut signal for restricting discharging of coating material.

The head unit HU includes the head 100 and the head controller 902. The head controller 902 includes an input unit 9021, a driving-voltage generator 9022, an amplifier 9023, and an output unit 9024, and may include, as necessary, a storage 9025. The functions thereof are implemented by an electric circuit. Part of the functions thereof can be implemented by software (central processing unit (CPU)).

The functions thereof may be implemented by multiple circuits or multiple pieces of software.

The input unit 9021 receives, from the comprehensive controller 900, a discharge cycle signal for discharging coating material based on image data.

In accordance with information on the discharge cycle signal for coating material received by the input unit 9021, the driving-voltage generator 9022 generates a driving voltage (driving waveform) for driving the piezoelectric element 132 of the head 100.

The amplifier 9023 amplifies the driving voltage generated by the driving-voltage generator 9022 and then outputs the amplified driving voltage to the output unit 9024.

The output unit 9024 applies, to the head 100 (piezoelectric element 132), the driving voltage amplified by the amplifier 9023.

The storage 9025 stores information on the open voltage to the needle valve 131 and information on the rate of discharging of coating material and the quantity of discharging of coating material. For example, for discharging operation with switching between multiple different types of coating material to the head 100 as a configuration, the storage 9025 stores the information on the open voltage to the needle valve 131 and the information on the rate of discharging of coating material and the quantity of discharging of coating material per type of coating material.

The head controller 902 stores various types of data into the storage 9025 or reads out various types of data from the storage 9025. Note that the storage 9025 may be provided inside the head controller 902, may be connected to the comprehensive controller 900 as indicated with a dashed line in FIG. 6, or may be provided inside the comprehensive controller 900.

A terminal device 901, such as a personal computer (PC), is connected to the comprehensive controller 900. The terminal device 901 receives an instruction input by a user through an input device, such as a keyboard, a mouse, or a touch panel, and transmits, to the comprehensive controller 900, a signal corresponding to the received instruction. The terminal device 901 receives, from the comprehensive controller 900, various types of signals indicating the states of operation of the head unit HU, the pressurizing supply mechanism 200, the head moving mechanism 300, and the discharge valve 402, and displays, onto an output device, such as a display or a touch panel, information corresponding to the received signals.

As above, the head controller 902 generates a driving voltage (driving waveform) based on the discharge cycle signal for coating material received from the comprehensive controller 900 and then drives the head 100 with the generated driving voltage. The head 100 opens/shuts the nozzle hole 102 in accordance with the driving voltage from the head controller 902 to discharge coating material.

Based on the switch signal received from the comprehensive controller 900, the pressurizing supply mechanism 200 switches, for example, the air regulator 204 between on and off to switch the coating material in the coating-material tank 202 between the pressurized state and the unpressurized state.

Based on the moving signal received from the comprehensive controller 900, the head moving mechanism 300 drives the driving device 302 by a predetermined distance in a predetermined direction to move the head 100 to a desired position through the head holding member 301.

Based on the discharge-valve open/shut signal received from the comprehensive controller 900, the discharge valve 402 opens/shuts to restrict discharging of coating material such that coating material is discharged outward from the coating-material discharge channel 401 with the discharge valve 402 open.

Next, the hardware configuration of each of the comprehensive controller 900 and the head controller 902 will be described with FIG. 7. FIG. 7 is an explanatory diagram of an exemplary hardware configuration of a controller. Note that, as necessary, a constituent element may be added to or a constituent element may be deleted from the hardware configuration illustrated in FIG. 7.

The comprehensive controller 900 and the head controller 902 each include a central processing unit (CPU) 9001, a read only memory (ROM) 9002, a random access memory (RAM) 9003, a hard disk drive (HDD)/solid state drive (SSD) 9004, an input/output (I/O) interface 9005, a communication interface 9006, and a bus line 9007.

The CPU 9001 serves as an arithmetic logic unit that reads out a program or data stored in the ROM 9002 onto the RAM 9003 and performs processing to implement the function of a target device or the function of a target unit.

The ROM 9002 serves as a nonvolatile memory that can retain a program or data even when the power is turned off.

The RAM 9003 serves as a volatile memory used as a work area for the CPU 9001.

The HDD/SSD 9004 controls reading of various types of data or writing of various types of data under control of the CPU 901. Note that the function of the storage 9025 described above is implemented by the HDD/SSD 9004.

The I/O interface 9005 serves as an interface for input/output with a device, such as the head unit HU (head 100), the pressurizing supply mechanism 200, the head moving mechanism 300, or the discharge valve 402.

The communication interface 9006 serves as an interface for communication (connection) with a device that performs data processing, such as the terminal device 901, via a communication network.

The bus line 9007 serves as an address bus or data bus for electrical connection between each constituent element described above, and allows transmission of an address signal, a data signal, and various types of control signals. The CPU 9001, the ROM 9002, the RAM 9003, the HDD/SSD 9004, the I/O interface 9005, and the communication interface 9006 are mutually connected through the bus line 9007.

Operation of Head

Next, the operation of a head will be described with FIGS. 8A and 8B.

Figure 8B:
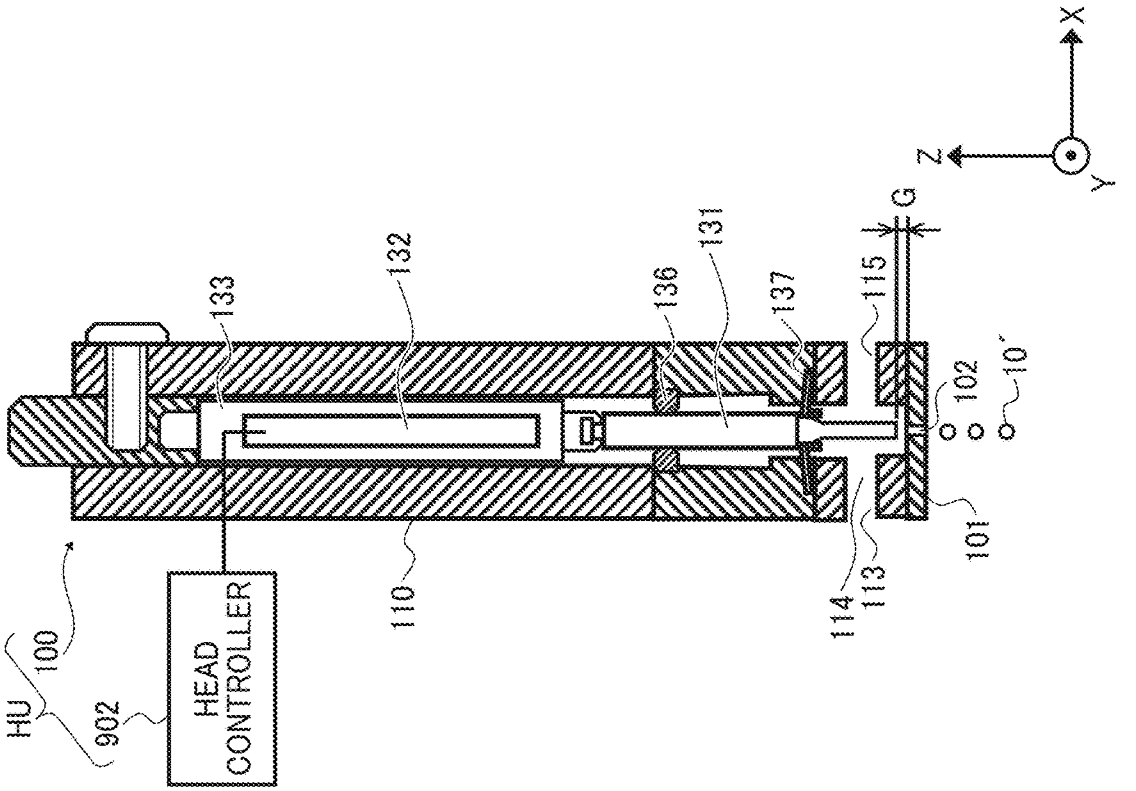
FIGS. 8A and 8B are explanatory views for the operation of a head.
Figure 8A:
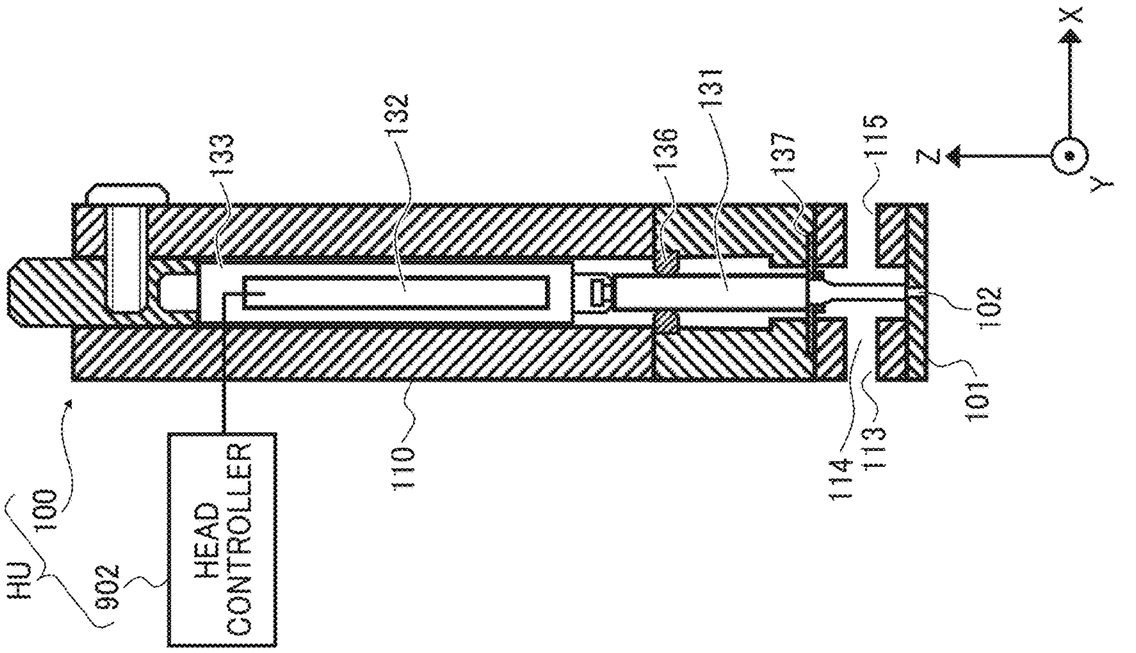

In response to application of the shut voltage to the piezoelectric element 132 based on application of a driving voltage from the head controller 902 to the piezoelectric element 132, as illustrated in FIG. 8A, the needle valve 131 abuts on the nozzle plate 101. In this case, since the nozzle hole 102 is shut by the needle valve 131, the coating material in the liquid chamber 114 is not discharged through the nozzle hole 102.

In response to application of the open voltage to the piezoelectric element 132, as illustrated in FIG. 8B, the piezoelectric element 132 contracts positively in the Z direction to move the needle valve 131 upward in FIG. 8B. That is, the needle valve 131 moves away from the nozzle plate 101, resulting in formation of a gap G between the leading end of the needle valve 131 and the nozzle hole 102. In this case, because the inner circumference of the sealing/positional restraint film 137, having fitted the needle valve 131, is displaced along with positive movement of the needle valve 131 in the Z direction, the sealing/positional restraint film 137 bends positively in the Z direction.

Since the coating material in the liquid chamber 114 has been pressurized and supplied at a predetermined pressure due to pressurized air from the pressurizing supply mechanism 200, simultaneously with formation of the gap G, the coating material in the liquid chamber 114 is discharged as a droplet 10' through the nozzle hole 102.

As above, in response to application of a driving voltage (open voltage/shut voltage) from the head controller 902 to the piezoelectric element 132, the needle valve 131 moves to separate from/abut on the nozzle plate 101, so that the needle valve 131 opens/shuts the nozzle hole 102.

As described above, according to the present embodiment, a head 100 includes: a liquid chamber 114 that houses coating material 10; a nozzle hole 102 in communication with the liquid chamber 114, the nozzle hole 102 allowing the coating material 10 to be discharged; a needle valve 131 that moves for separation from or contact with the nozzle hole 102 to open or shut the nozzle hole 102; a piezoelectric element 132 that causes the needle valve 131 to move for separation or contact; a housing 110 including the liquid chamber 114 and a housing chamber 116 that houses the needle valve 131 and the piezoelectric element 132; and a sealing/positional restraint film 137 sheet-shaped, the sealing/positional restraint film 137 having flexibility in the direction in which the needle valve 131 moves for separation or contact, the sealing/positional restraint film 137 including: an inner circumference fitting the outer circumference of the needle valve 131; and a rim secured to the housing 110, the sealing/positional restraint film 137 restricting the position of the needle valve 131 in the transverse direction (XY direction) orthogonal to the discharge direction in which the needle valve 131 moves to be separated from or contact with the nozzle hole 102 (Z direction), in which the needle valve 131 is supported in the housing chamber 116 through the sealing/positional restraint film 137.

As described above, the sealing/positional restraint film 137 has sealability to prevent the coating material 10 from entering from the liquid chamber 114 to the housing chamber 116.

As described above, the head 100 further includes a second positional restraint member (bearing 136 in the first embodiment) located away opposite the liquid chamber 114 across a first positional restraint member, as which the sealing/positional restraint film 137 is defined, in the direction in which the needle valve 131 moves for separation or contact, the second positional restraint member restricting the position of the needle valve 131 in the transverse direction orthogonal to the discharge direction in which the needle valve 131 moves for separation or contact.

Thus, the position and posture of the needle valve 131 to the nozzle hole 102 are retained, leading to obtainment of reliable discharging of coating material. The sealing/positional restraint film 137 can prevent the coating material 10 from entering from the liquid chamber 114 to the housing chamber 116, leading to a reduction in the sliding resistance to the needle valve 131 in terms of sealing function. Thus, the needle valve 131 can be driven with a low resistance.

Comparative Example

Figure 9:
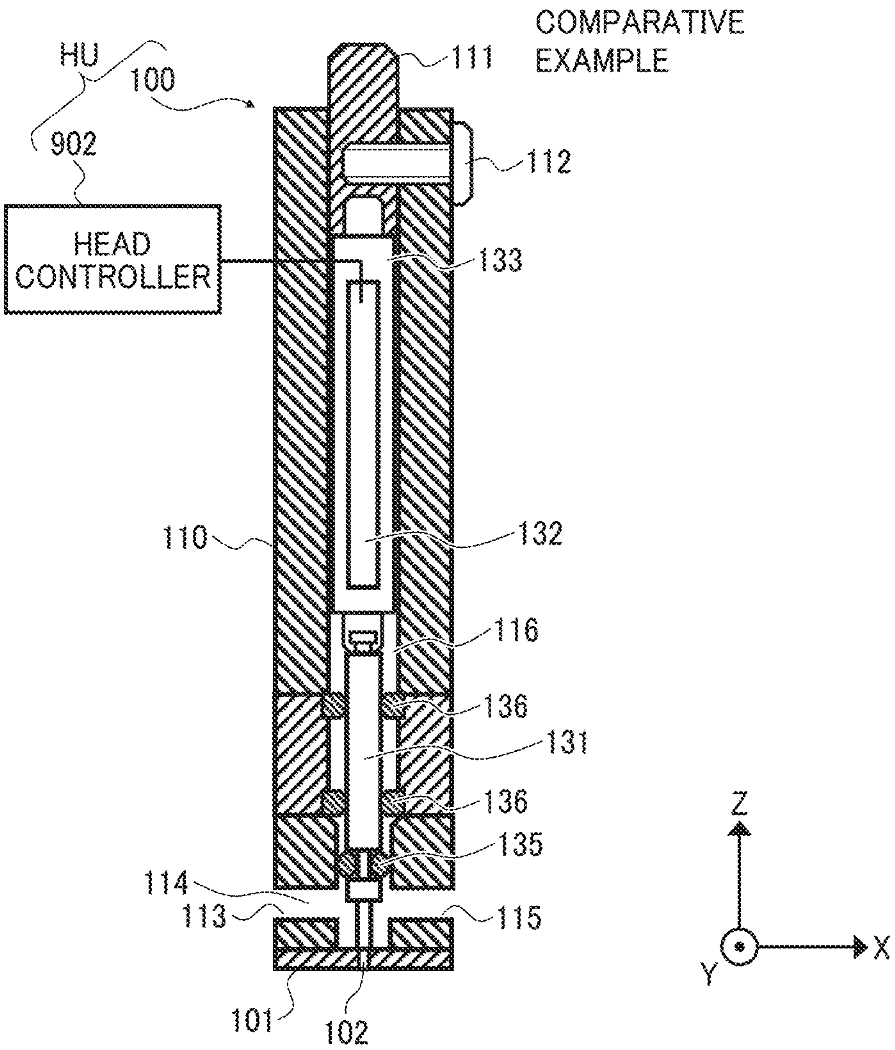
FIG. 9 is a schematic cross-sectional view of a head configuration according to a comparative example.

A configuration according to a comparative example will be described. FIG. 9 is a schematic cross-sectional view of a head configuration according to the comparative example.

The head configuration according to the comparative example is different from the head configuration according to the first embodiment in terms of a support structure for a needle valve 131. In the comparative example, the needle valve 131 is supported by two bearings (sliding bearings) 136 in a housing 110. The two bearings 136 restrict the posture of the needle valve 131 (slanting in the XY directions). The needle valve 131 is provided with a sealing member 135 including a contact type of sealant, such as an O ring, a D ring, or an X ring. The sealing member 135 prevents the coating material in a liquid chamber 114 from flowing into a housing chamber 116.

In such a type of liquid discharge head, when positional misalignment (core misalignment) occurs between a needle valve 131 and a nozzle hole 102 (nozzle plate 101), coating material is difficult to discharge in the direction of a target through the nozzle hole 102. When the needle valve 131 slants with respect to the nozzle hole 102 (nozzle plate 101), opening/shutting for discharging is difficult to carried out and the needle valve 131 needs a long stroke for opening/shutting, leading to influence on discharging performance.

Thus, according to the comparative example, the bearings 136 restrict the needle valve 131 from positional misalignment (core misalignment) in the XY directions. In addition, a bearing long (thick) in the Z direction or the bearings 136 disposed at an interval in the Z direction as illustrated restrict the needle valve 131 from slanting.

However, in the configuration according to the comparative example, the sliding resistance of the sealing member 135 is inconstant and dirt on the sealing member 135 or abrasion of the sealing member 135 over time causes a change in sliding resistance. Due to the positional relationship between the needle valve 131 and each bearing 136, the sliding resistance is inconstant. A change is made in sliding resistance due to deterioration over time, such as abrasion. Such changes in sliding resistance have influence on discharging performance, leading to a change in the quantity of discharging, a change in responsivity for discharging, or leakage from the nozzle hole 102.

In the present embodiment, provided is a sheet-shaped member having an inner circumference fitting the outer circumference of the needle valve 131 and a rim secured to the housing 110. The sheet-shaped member restricts the position of the needle valve 131 to the nozzle plate 101 and enables the needle valve 131 to drive with a low resistance.

Second Embodiment

Figure 10:
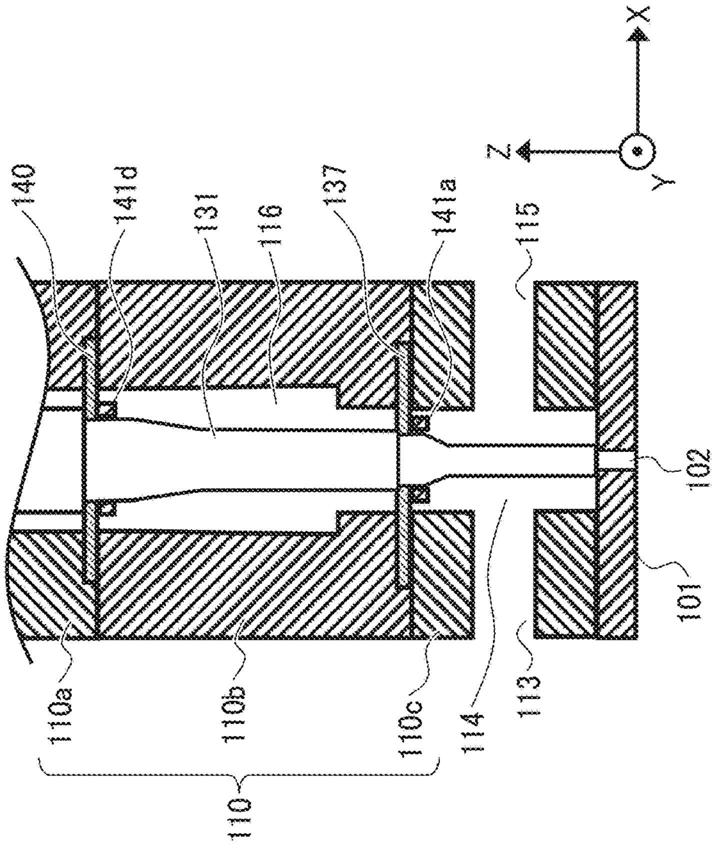
FIG. 10 is a schematic cross-sectional view of main parts according to a second embodiment.

Next, a second embodiment will be described with FIG. 10. FIG. 10 is a schematic cross-sectional view of main parts according to the second embodiment.

A housing 110 includes three sub-housings (a first housing 110*a*, a second housing 110*b*, and a third housing 110*c*), similarly to the housing 110 according to the first embodiment. A needle valve 131 is supported in a housing chamber 116 by a sealing/positional restraint film 137 at an end in the Z direction of the second housing 110*b* and a positional restraint film 140 at the other end in the Z direction of the second housing 110*b*. The sealing/positional restraint film 137 is an exemplary positional restraint member and is also an exemplary first positional restraint member. The positional restraint film 140 is an exemplary second positional restraint member. A support structure for the needle valve 131 with the sealing/positional restraint film 137 is similar to the support structure according to the first embodiment, and thus description thereof will be omitted.

The positional restraint film 140 serves as a sheet-shaped member including a single layer or multiple layers flexible in the direction in which the needle valve 131 moves for separation or contact (Z direction) and has an inner circumference fitting the outer circumference of the needle valve 131 and a rim secured to the housing 110.

Although the inner circumference and rim of the positional restraint film 140 will be described later, as a brief description, in a case where the cross section on the XY plane of the needle valve 131 is circular in shape, the inner circumference of the positional restraint film 140 corresponds to a circular hole that fits the needle valve 131. In the present embodiment, the rim of the positional restraint film 140 corresponds to a part nipped between the first housing 110*a* and the second housing 110*b*.

For example, the first housing 110*a* has a recess, of which the depth is less than the thickness of the positional restraint film 140, at its part facing the rim of the positional restraint film 140. The positional restraint film 140 located on the recess is secured to the housing 110 due to compression of the rim of the positional restraint film 140 between the first housing 10*a* and the second housing 110*b* based on joining of the housings 110*a*, 110*b*, and 110*c*.

A press member 141*d* is fitted to the needle valve 131 extending downward through the positional restraint film 140. The press member 141*d* thrusts the positional restraint film 140, for example, against a step with which the needle valve 131 is provided.

As above, the needle valve 131, of which the position is restricted by the sealing/positional restraint film 137 and the positional restraint film 140 in the transverse direction (XY direction) orthogonal to the discharge direction in which the needle valve 131 moves for separation from or contact with a nozzle plate 101 (Z direction), is supported in the housing chamber 116. The sealing/positional restraint film 137 and the positional restraint film 140 each have, due to its tensile balance, a positional restraint function for restricting the position in the XY directions of the needle valve 131 to the housing 110. The sealing/positional restraint film 137 has, in addition to the positional restraint function, a sealing function for preventing the coating material supplied to a liquid chamber 114 from entering the housing chamber 116.

As described above, according to the present embodiment, provided is the second positional restraint member (positional restraint film 140 in the second embodiment) located away opposite the liquid chamber 114 across the first positional restraint member, as which the sealing/positional restraint film 137 is defined, in the direction in which the needle valve 131 moves for separation or contact (Z direction), the second positional restraint member restricting the position of the needle valve 131 in the transverse direction (XY direction) orthogonal to the discharge direction in which the needle valve 131 moves for separation or contact.

According to the second embodiment, the needle valve 131 can be accurately restricted from positional misalignment (core misalignment) to a nozzle hole 102 and from slanting with respect to the nozzle plate 101, without sliding resistance since no bearing 136 is used to support the needle valve 131. As a result, the needle valve 131 can be driven in the Z direction by a small driving force. The difference in driving force between individuals and change over time can be reduced, leading to more reliable discharging performance.

Third Embodiment

Figure 11:
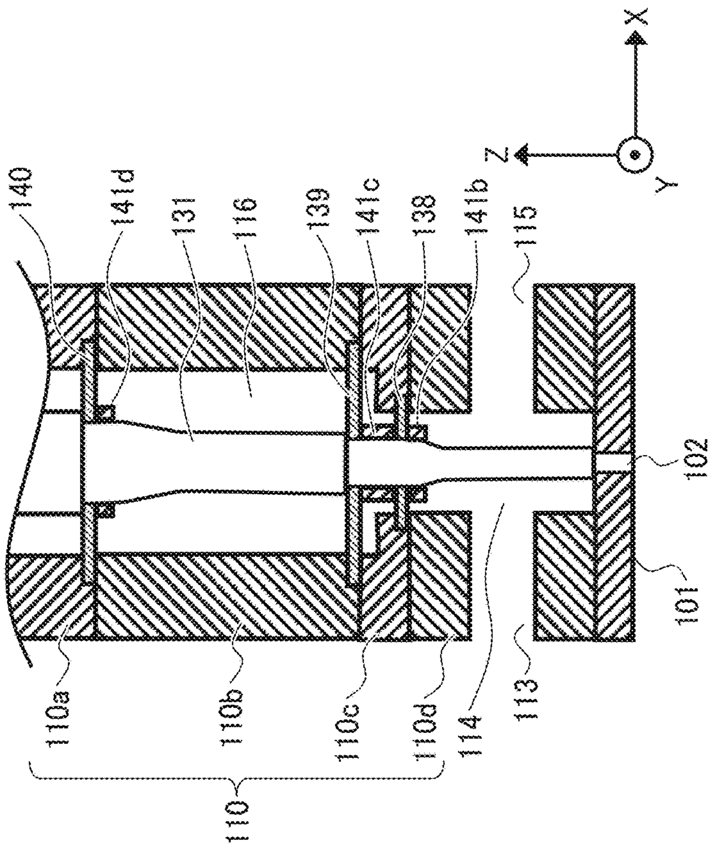
FIG. 11 is a schematic cross-sectional view of main parts according to a third embodiment.

Next, a third embodiment will be described with FIG. 11. FIG. 11 is a schematic cross-sectional view of main parts according to the third embodiment.

In the third embodiment, a housing 110 includes four sub-housings (a first housing 110*a*, a second housing 110*b*, a third housing 110*c*, and a fourth housing 110*d*). A needle valve 131 is supported in a housing chamber 116 by a positional restraint film 139 at an end in the Z direction of the second housing 110*b* and a positional restraint film 140 at the other end in the Z direction of the second housing 110*b*. The positional restraint film 139 is an exemplary positional restraint member and is also an exemplary first positional restraint member. The positional restraint film 140 is an exemplary second positional restraint member. A support structure for the needle valve 131 with the positional restraint film 139 is similar to the respective support structures according to the first and second embodiments, and thus description thereof will be omitted. A support structure for the needle valve 131 with the positional restraint film 140 is similar to the support structure according to the second embodiment, and thus description thereof will be omitted.

In the third embodiment, instead of a sealing/positional restraint film 137 having a sealing function and a positional restraint function, a membranal member has a sealing function and another membranal member has a positional restraint function. That is, in the third embodiment, a sealing film 138 at an end in the Z direction of the third housing 110*c* has a sealing function and the positional restraint film 139 has a positional restraint function for the needle valve 131. The sealing film 138 is an exemplary sealing member.

A press member 141*c* is fitted to the needle valve 131 extending downward through the positional restraint film 139. The press member 141*c* thrusts the positional restraint film 139, for example, against a step with which the needle valve 131 is provided. Note that the press member 141*c* may have a length in the Z direction identical to the interval between the positional restraint film 139 and the sealing film 138 in the Z direction. Thus, the press member 141*c* functions as a spacer, enabling retention of the interval in the Z direction between the positional restraint film 139 and the sealing film 138.

The sealing film 138 serves as a sheet-shaped member including a single layer or multiple layers flexible in the direction in which the needle valve 131 moves for separation or contact. Similarly to the positional restraint films 139 and 140, the sealing film 138 has an inner circumference fitting the outer circumference of the needle valve 131 and a rim secured to the housing 110.

Although the inner circumference and rim of the sealing film 138 will be described later, as a brief description, in a case where the cross section on the XY plane of the needle valve 131 is circular in shape, the inner circumference of the sealing film 138 corresponds to a circular hole that fits the needle valve 131. In the present embodiment, the rim of the sealing film 138 corresponds to a part nipped between the third housing 110*c* and the fourth housing 110*d*.

For example, the third housing 110*c* has a recess, of which the depth is less than the thickness of the sealing film 138, at its part facing the rim of the sealing film 138. The sealing film 138 located on the recess is secured to the housing 110 due to compression of the rim of the sealing film 138 between the third housing 110*c* and the fourth housing 110*d* based on joining of the housings 110*a*, 110*b*, 110*c*, and 110*d*.

A press member 141*b* is fitted to the needle valve 131 extending downward through the sealing film 138. The press member 141*b* thrusts the sealing film 138, for example, against a step formed of an end face of the press member 141*c* and the outer circumferential face of the needle valve 131.

As above, the needle valve 131, of which the position is restricted by the positional restraint film 139 and the positional restraint film 140 in the transverse direction (XY direction) orthogonal to the discharge direction in which the needle valve 131 moves for separation from or contact with a nozzle plate 101 (Z direction), is supported in the housing chamber 116. The positional restraint films 139 and 140 each have, due to its tensile balance, a positional restraint function for restricting the position in the XY directions of the needle valve 131 to the housing 110.

In the third embodiment, the sealing film 138 and the positional restraint film 139, which are separate membranal members, have a sealing function and a positional restraint function, respectively. Thus, a material to be selected for each film does not need to enable compatible achievement of a sealing function and a positional restraint function, leading to flexible material selection.

Preferably, the facing portion (sealing portion) of the sealing film 138 to a liquid chamber 114 is smaller in area than the flexible portion of the positional restraint film 139 (portion that is not nipped between the third housing 110*c* and the fourth housing 110*d* and is flexible). A smaller area of the facing portion of the sealing film 138 to the liquid chamber 114 leads to a reduction in the area under pressure from coating material pressurized and supplied to the liquid chamber 114 (area of reception of pressure). Thus, the pressure dependence of coating material to the sealing film 138 can be reduced.

The sealing film 138 has a sealing portion facing the liquid chamber 114, and the sealing portion having a first area. The positional restraint film 139 (sheet member) has a flexible portion flexible in the discharge direction, and the flexible portion having a second area. The first area of the sealing portion is smaller than the second area of the flexible portion.

Meanwhile, a larger area of the positional restraint film 139 enables not only easy deformation in the Z direction but also accurate positional restriction in the XY directions and easy shape and material selection for the positional restraint film to deform easily in the Z direction, leading to an enhancement in the degree of freedom of design.

As described above, according to the present embodiment, between the liquid chamber 114 and the positional restraint film 139, provided is the sealing film 138 that has flexibility in the direction in which the needle valve 131 moves for separation or contact (Z direction) and prevents coating material from entering from the liquid chamber 114 to the housing chamber 116. The sealing film 138 has an inner circumference fitting the outer circumference of the needle valve 131 and a rim secured to the housing 110.

Thus, a material to be selected for each of the sealing film 138 and the positional restraint film 139 does not need to enable compatible achievement of a sealing function and a positional restraint function, leading to flexible material selection.

As described above, the facing portion of the sealing film 138 to the liquid chamber 114 is smaller in area than the flexible portion of the positional restraint film 139.

Thus, the pressure dependence of coating material to the sealing film 138 has less influence.

Modifications

Figure 12A:
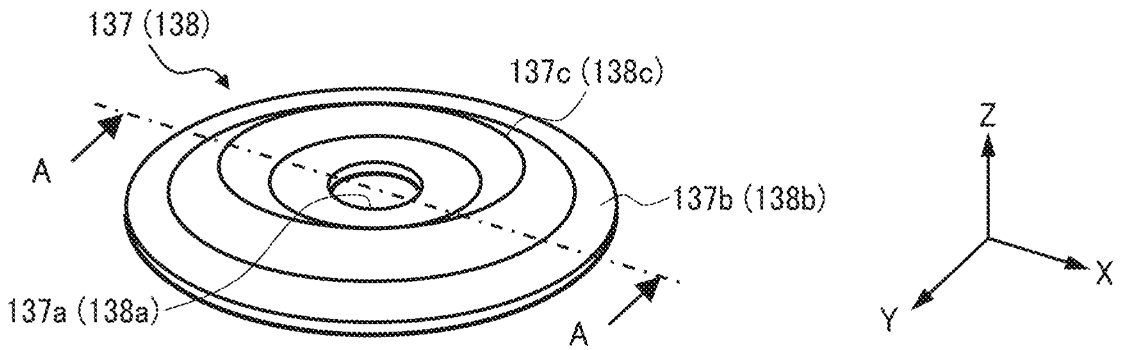
FIGS. 12A to 12C are explanatory views of respective sealing/positional restraint films or sealing films according to modifications.
Figure 12B:
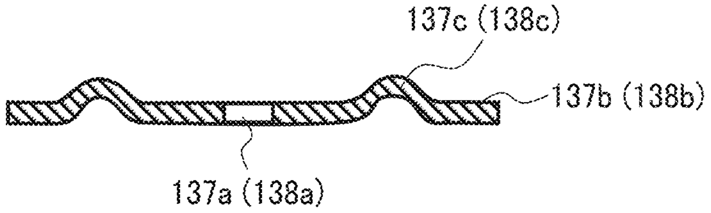
Figure 12C:
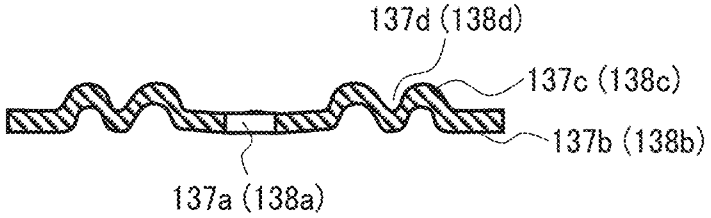

Next, respective positional restraint films or sealing films according to modifications will be described with FIGS. 12A to 12C. In addition, respective positional restraint films according to modifications will be described with FIGS. 13A to 15G. FIG. 12A to 12C are explanatory views of respective sealing/positional restraint films or sealing films according to modifications. FIG. 12A is a perspective view of a sealing/positional restraint film 137 or a sealing film 138. FIG. 12B is a cross-sectional view taken along line A-A of FIG. 12A. FIG. 12C is a cross-sectional view of a further modification of the configuration of FIG. 12B.

The cross section of the sealing/positional restraint film 137 in the first embodiment and the cross section of the sealing film 138 in the third embodiment are not limited to being flat. For example, as illustrated in FIGS. 12A and 12B, a corrugated cross section may be provided. That is, for a corrugated cross section, provided is a protrusion 137*c* (138*c*) protruding positively in the Z direction between a needle-valve fitting hole 137*a* (138*a*) that fits the outer circumference of a needle valve 131 and a rim 137*b* (138*b*) that is secured to a housing 110.

Alternatively, as illustrated in FIG. 12C, for a corrugated cross section, provided may be a protrusion 137*c* (138*c*) protruding positively in the Z direction and a recess 137*d* (138*d*) based on a negative protrusion in the Z direction. The needle-valve fitting hole 137*a* at the center of such a sealing/positional restraint film 137 is an exemplary inner circumference. The needle-valve fitting hole 138*a* at the center of such a sealing film 138 is an exemplary inner circumference.

As above, a sealing/positional restraint film 137 having a corrugated cross section ranging from the inner circumference (needle-valve fitting hole) 137*a* to the rim 137*b* and a sealing film 138 having a corrugated cross section ranging from the inner circumference (needle-valve fitting hole) 138*a* to the rim 138*b* deform easily in the Z direction. Thus, a reduction can be made in the load of a piezoelectric element 132 that drives a needle valve 131.

In such a modification as above, examples of material that can be used include a metal thin plate, such as a stainless steel thin plate, a thin-film resin sheet, such as a thin-film polytetrafluoroethylene (PTFE) sheet, and rubber material. For example, a sealing/positional restraint film 137 and a sealing film 138 each having a corrugated cross section can be manufactured by pressing to a metal thin film, hot pressing to a thin-film resin sheet, or die forming to rubber material.

Figure 13A:
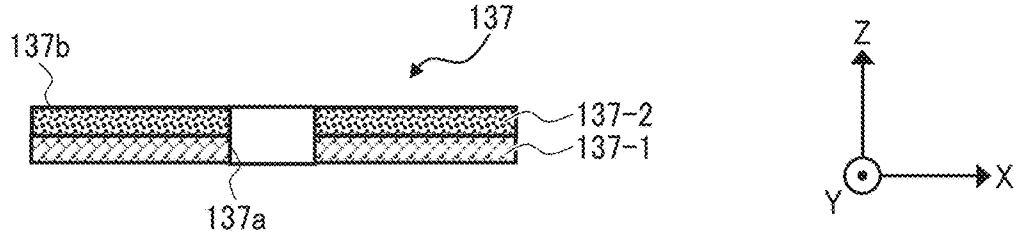
FIGS. 13A and 13B are explanatory views of respective sealing/positional restraint films according to modifications.
Figure 13B:
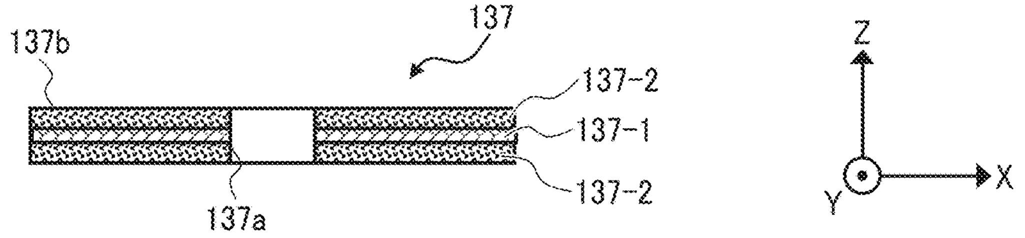

FIGS. 13A and 13B are explanatory views of respective sealing/positional restraint films according to modifications. FIG. 13A is a cross-sectional view of an exemplary two-layer structure. FIG. 13B is a cross-sectional view of an exemplary three-layer structure.

The sealing/positional restraint film 137 in the first embodiment is not limited to a single-layer structure.

For example, as illustrated in FIG. 13A, a sealing/positional restraint film 137 may be a multiple sheet having a two-layer structure including a fiber layer 137-1 and a resin layer 137-2. As illustrated in FIG. 13B, a sealing/positional restraint film 137 may be a multiple sheet having a three-layer structure including a fiber layer 137-1 having a resin layer 137-2 on the top side and a resin layer 137-2 on the bottom side. Such a resin layer 137-2 includes at least either resin or rubber.

As above, a sealing/positional restraint film 137 including a fiber layer 137-1 and a resin layer 137-2 including at least one of resin and rubber can accurately restrict the position in the XY direction of a needle valve 131 since the resin layer 137-2 is reinforced with the fiber of the fiber layer 137-1. In addition, the sealing/positional restraint film 137 has flexibility, because of its material, to deform smoothly in the Z direction.

In such a modification as above, mesh or fiber is used as the material of a fiber layer 137-1 and rubber or resin material is used as the material of a resin layer 137-2. A fiber layer 137-1 and a resin layer 137-2 are mutually bonded to make a multiple sheet. Alternatively, for example, cloth is coated with resin by a coating fabric technique to manufacture a multiple sheet.

Figure 14A:
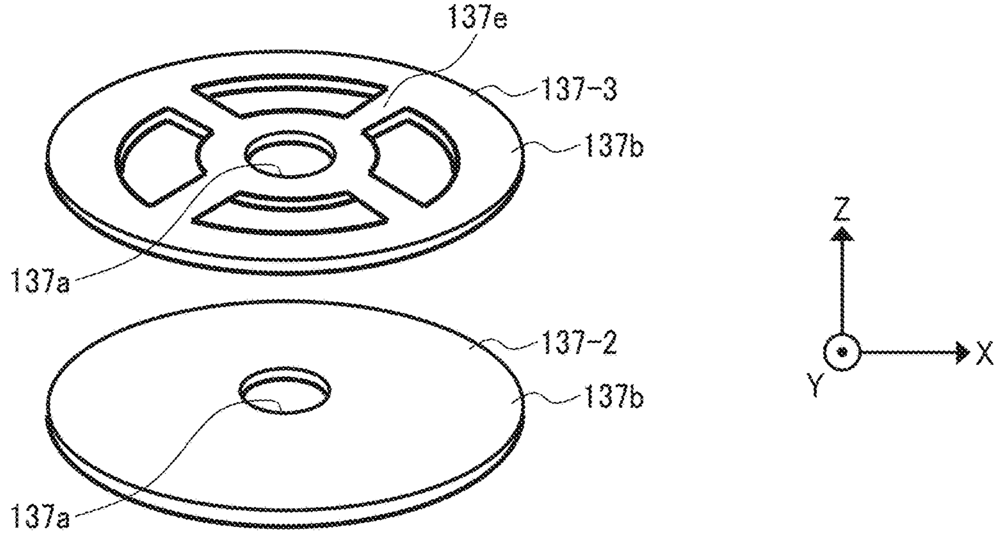
FIGS. 14A and 14B are explanatory views of a sealing/positional restraint film according to a modification.
Figure 14B:
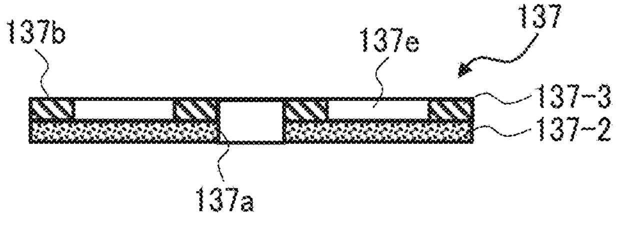

FIGS. 14A and 14B are explanatory views of a sealing/positional restraint film according to a modification. FIG. 14A is a perspective exploded view of a sealing/positional restraint film 137. FIG. 14B is a cross-sectional view of the sealing/positional restraint film 137.

The sealing/positional restraint film 137 in the first embodiment may be a multiple sheet having a two-layer structure including a resin layer 137-2 and a metal layer 137-3. The resin layer 137-2 includes at least either resin or rubber. The metal layer 137-3 has an inner circumference (needle-valve fitting hole 137*a*), a rim 137*b*, and a beam 137*e* coupling the inner circumference and the rim 137*b* partially (coupling at four places in the present example).

Regarding a sealing/positional restraint film 137 including the resin layer 137-2 and the metal layer 137-3 having the beam 137*e* including multiple beams, the resin layer 137-2 can prevent coating material from entering and the metal layer 137-3 can accurately restrict, due to its tensile balance, the position in the XY directions of a needle valve 131. Since the inner circumference (needle-valve fitting hole 137*a*) and the rim 137*b* are coupled through the beam 137*e*, the metal layer 137-3 is light in weight and can deform easily in the Z direction.

Note that, in the present modification, the metal layer 137-3 may be replaced with a resin layer. That is, a sealing/positional restraint film 137 may include two resin layers 137-2 and 137-3, and the resin layer 137-3 may have an inner circumference (needle-valve fitting hole 137*a*), a rim 137*b*, and a beam 137*e* coupling the inner circumference and the rim 137*b* partially.

In the present modification, rubber or resin material is used as the material of the resin layer 137-2 and stainless steel is used as the material of the metal layer 137-3. An example of rubber as the resin layer 137-2 is a perfluoroelastomer (FFKM) film having high solvent resistance and having a thickness of 0.5 mm or less. An example of resin as the resin laver 137-2 is a PTFE thin film having a thickness of approximately 50 to 200 μm. An example of the metal layer 137-3 is an etched product of a stainless steel plate having a thickness of approximately 20 to 100 μm.

An example of a resin layer 137-3 resulting from replacement of the metal layer 137-3 with a resin layer is a blanked product of a resin plate that is made of polyether ether ketone (PEEK) and has a thickness of approximately 0.1 to 0.5 mm. The resin layer 137-2 and the metal layer 137-3 are mutually bonded to make a multiple sheet. Alternatively, for example, the resin layer 137-2 and the metal layer 137-3 can be integrally formed (multiple formation) by injection molding, such as insert molding.

Next, the respective beam structures of positional restraint films according to modifications will be described with FIGS. 15A to 15G. FIGS. 15A to 15G are each a plan view of a positional restraint film having an exemplary pattern of beam structure.

Similarly to the metal layer 137-3 of the sealing/positional restraint film 137 described above, a second positional restraint member, such as the positional restraint film 140 in the second embodiment or the positional restraint film 139 or 140 in the third embodiment, may have a beam structure. As illustrated in FIGS. 15A to 15G, various patterns of beam structures are conceivable.

Figure 15A:
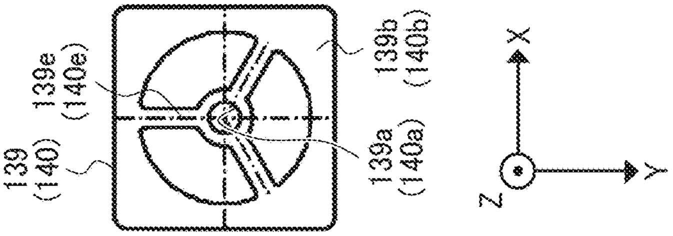
FIGS. 15A to 15G are each a plan view of a positional restraint film having an exemplary pattern of beam structure.

Referring to FIG. 15A, a positional restraint film 139 (140) is sheet-shaped and has flexibility in the direction in which a needle valve 131 moves for separation or contact (Z direction). The positional restraint film 139 (140) has a needle-valve fitting hole 139*a* (140*a*) that fits the outer circumference of the needle valve 131 and a rim 139*b* (140*b*) that is secured to a housing 110. The needle-valve fitting hole 139*a* (140*a*) is an exemplary inner circumference. Abeam 139*e* (140*e*) couples the needle-valve fitting hole 139*a* (140*a*) and the rim 139*b* (140*b*) partially at three places.

The positional restraint film 139 or 140 having such a beam structure as above is made of metal or resin and is deformable easily in the Z direction because of the flexibility of its material. The positional restraint film 139 or 140 can accurately restrict, due to its tensile balance, the position in the XY direction of the needle valve 131.

Figure 15B:
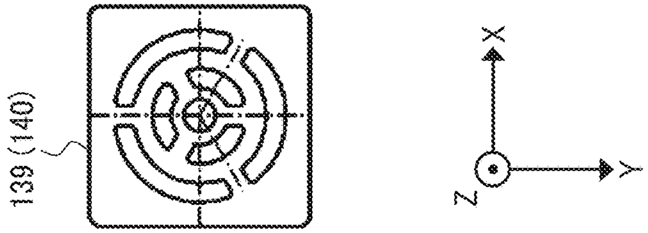
Figure 15C:
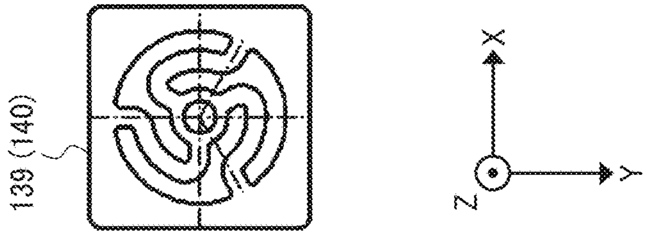
Figure 15D:
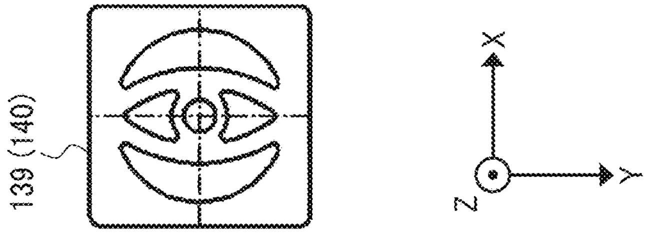
Figure 15E:
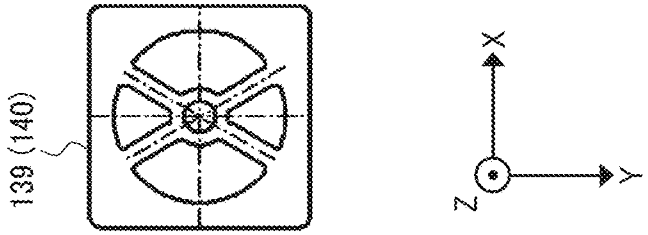
Figure 15F:
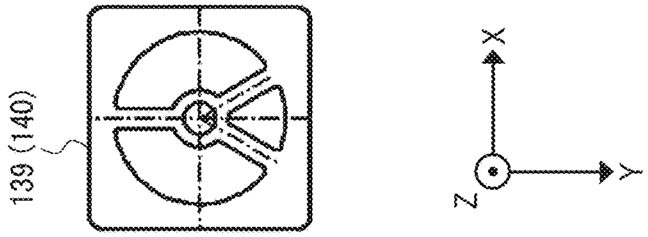
Figure 15G:
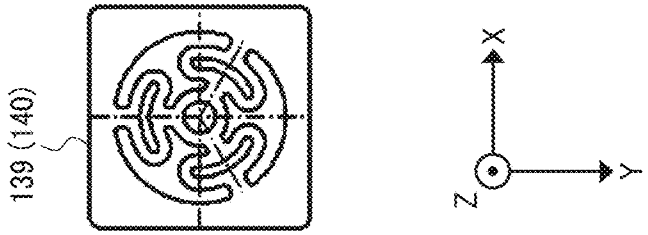

Like the respective patterns in FIGS. 15B and 15C, a layout is made such that a beam coupling the rim and the inner circumference (needle-valve fitting hole) has a longer length, leading to easy deformation in the Z direction. Like the respective patterns in FIGS. 15D, 15E, and 15F, a layout shortened in the X direction is made, enabling a shorter pitch of mounting of needle valves 131, leading to a reduction in the size of a head 100. The respective patterns in FIGS. 15C and 15G facilitate absorption of minute displacement in the XY directions, so that a minute slant of a needle valve 131 can follow a nozzle plate 101.

Exemplary Positional Restriction of Needle Valve

Figure 16:
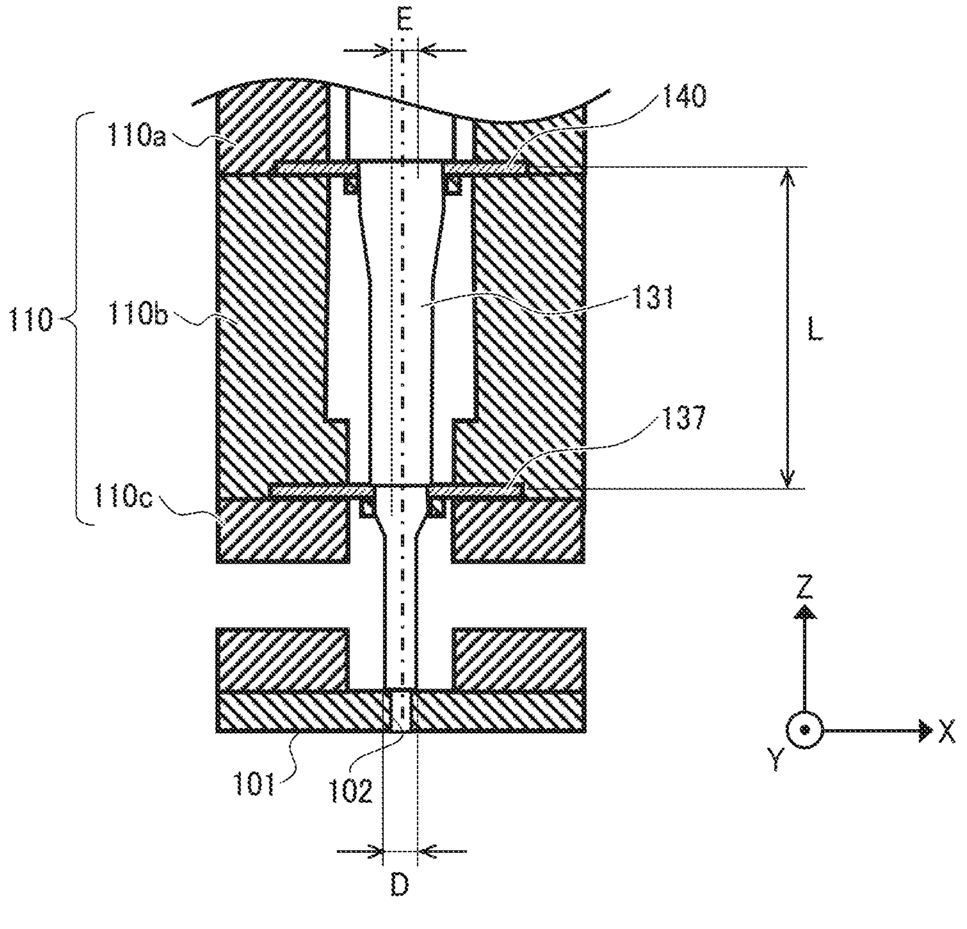
FIG. 16 is an explanatory view for exemplary arrangement of positional restraint films to a needle valve.

Next, phenomena due to the slant of a needle valve 131 will be described with FIGS. 16 to 18. FIG. 16 is an explanatory view for exemplary arrangement of positional restraint films to a needle valve.

Figure 17A:
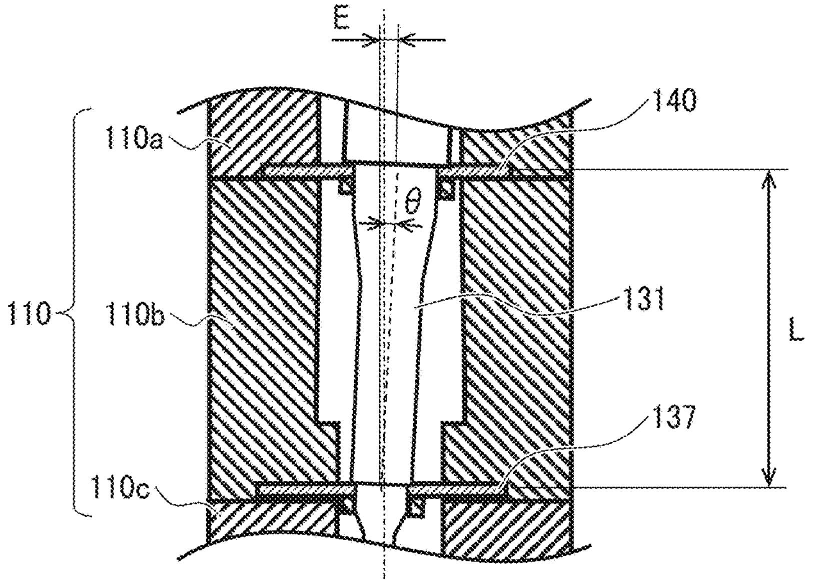
FIGS. 17A and 17B are explanatory views for positional restraint of a needle valve.
Figure 17B:
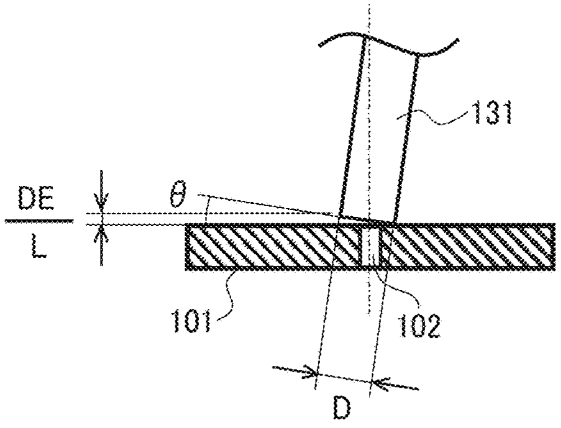

FIGS. 17A and 17B are explanatory views for positional restriction of a needle valve. FIG. 17A is an explanatory view of a support structure for the needle valve. FIG. 17B is an enlarged view of the leading end of the needle valve.

Referring to FIG. 16, a dot-and-dash line passing through the center of a needle valve 131 indicates a perpendicular line to the center of a nozzle hole 102 that a nozzle plate 101 has. The deviation from the perpendicular line is denoted with E (mm). The deviation E can be regarded as the difference between the center position of the needle valve 131 at the position of a sealing/positional restraint film 137 that is an exemplary first positional restraint member and the center position of the needle valve 131 at the position of a positional restraint film 140 that is an exemplary second positional restraint member. Length L (mm) represents the interval between the sealing/positional restraint film 137 and the positional restraint film 140. Length D (mm) represents the diameter of the leading end of the needle valve 131.

In response to the deviation E in the above relationship, as illustrated in FIGS. 17A and 17B, the needle valve 131 slants at angle θ (rad) ($\theta=\arctan(E/L)$). A gap at the leading end of the needle valve 131 (at the leading-end face that shuts the nozzle hole 102) based on the slant is given by the following expression: $D \cdot \tan\theta = D \cdot E/L$ (mm) $= D \cdot E \times 1000/L$ (μm).

Against the deviation E, the sealing/positional restraint film 137 that is an exemplary first positional restraint member may be different in configuration from the positional restraint film 140 that is an exemplary second positional restraint member. For example, provided are a sealing/positional restraint film 137 having such a corrugated cross section as illustrated in FIGS. 12A to 12C and a positional restraint film 140 having such a beam structure as illustrated in FIG. 15C. The positional restraint film 140 having such a beam structure as illustrated in FIG. 15C can absorb minute displacement in the XY directions (directions perpendicular to the direction in which the needle valve moves for separation or contact) as described above. The positional restraint film 140 may absorb the deviation E.

As illustrated in FIG. 17A, when the leading end of the needle valve 131 abuts on the nozzle plate 101, the force of turning counterclockwise in FIG. 17A is applied to the needle valve 131 such that its leading end follows an abutment face on the nozzle plate 101. That is, the force of turning in the direction in which θ decreases is applied to the needle valve 131. In accordance with the force of turning of the needle valve 131, the positional restraint film 140 absorbs part of the deviation E. As a result, with the needle valve 131 abutting on the nozzle plate 101, the positional restraint film 140 absorbs displacement in the XY directions, leading to a reduction in the slant angle θ of the needle valve 131. Thus, the needle valve 131 can seal the nozzle hole 102.

In the above example, the positional restraint film 140 that is an exemplary second positional restraint member absorbs part of the deviation E in the XY directions with the needle valve 131 located such that the nozzle hole 102 is shut. Tus, even in a case where a minute deviation E occurs, the needle valve 131 can shut the nozzle hole 102.

Figure 18:
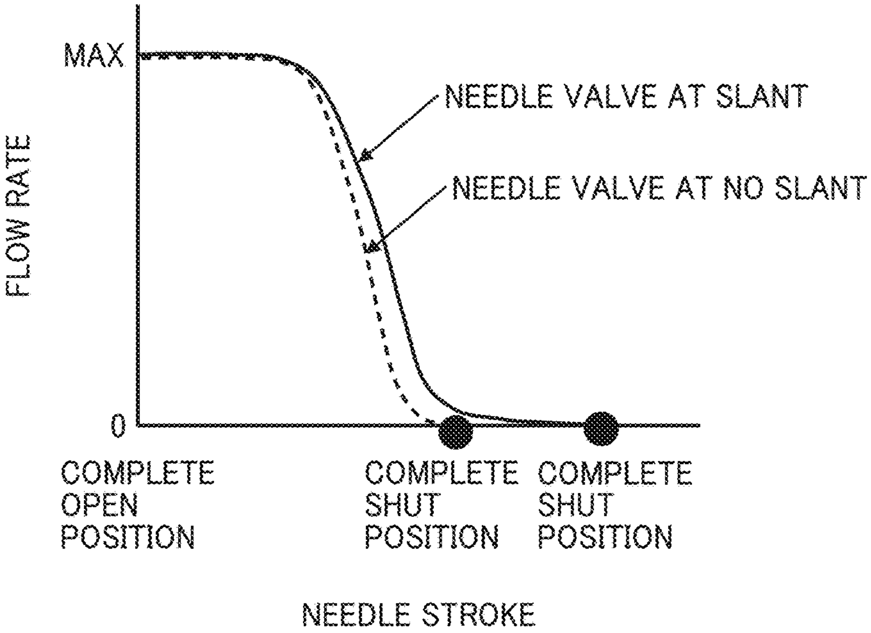
FIG. 18 is an explanatory graph for phenomena due to the slant of a needle valve.

FIG. 18 is an explanatory graph for phenomena due to the slant of a needle valve. The open/shut characteristic of the needle valve 131 leads to such a flow-rate characteristic as illustrated in a case where the horizontal axis is defined as needle stroke and the vertical axis is defined as the flow rate of discharging from the nozzle hole 102. In order to completely shut the nozzle hole 102, the needle valve 131 has a longer stroke at a slant (solid line) than at no slant (dashed line). In particular, just before the complete shut position, the needle valve 131 is shutting the nozzle hole 102 while the leading end of the needle valve 131 is transitioning from partial contact to complete contact with the nozzle plate 101. Thus, more stroke is required. A large load is required for shutting of the nozzle hole 102 with the needle valve 131, leading to an increase in the load of the piezoelectric element 132. Therefore, if the needle valve 131 slants, the responsivity of opening/shutting of the needle valve 131 and responsivity for discharging are influenced.

Specifically, the needle stroke of the needle valve 131 at no slant from the complete open position to the complete shut position is approximately 30 μm and the stroke of the piezoelectric element 132 is approximately 50 μm. In order to operate the needle valve 131 from the complete open position to the complete shut position with the stroke range, the gap ($D \cdot E \times 1000/L$) due to the slant of the leading end of the needle valve 131 is required to be 15 μm or less, desirably, 5 μm or less.

In a case where the diameter of the nozzle hole is approximately 50 to 100 μm and the diameter D of the leading end of the needle valve is 0.5 mm, it is assumed that the accuracy of restricting the center position of the needle valve with the positional restraint films is approximately 0.05 mm and the deviation E between the positional restraint films is approximately 0.1 mm maximum.

Under the assumption, in order to suppress the gap due to the slant of the leading end of the needle valve at 5 μm or less, the interval L between the sealing/positional restraint film 137 and the positional restraint film 140 is required to be 10 mm or more. For example, in a case where the deviation E deteriorates with the interval L set at 10 mm, a further increase is made in the interval L to restrict the needle valve from slanting. Note that the above numerical values are exemplary and thus each numerical value may be approximately changed, for example, in accordance with the diameter of the nozzle hole 102 and the outer diameter of the needle valve 131 for use.

Applied Examples

Figure 19:
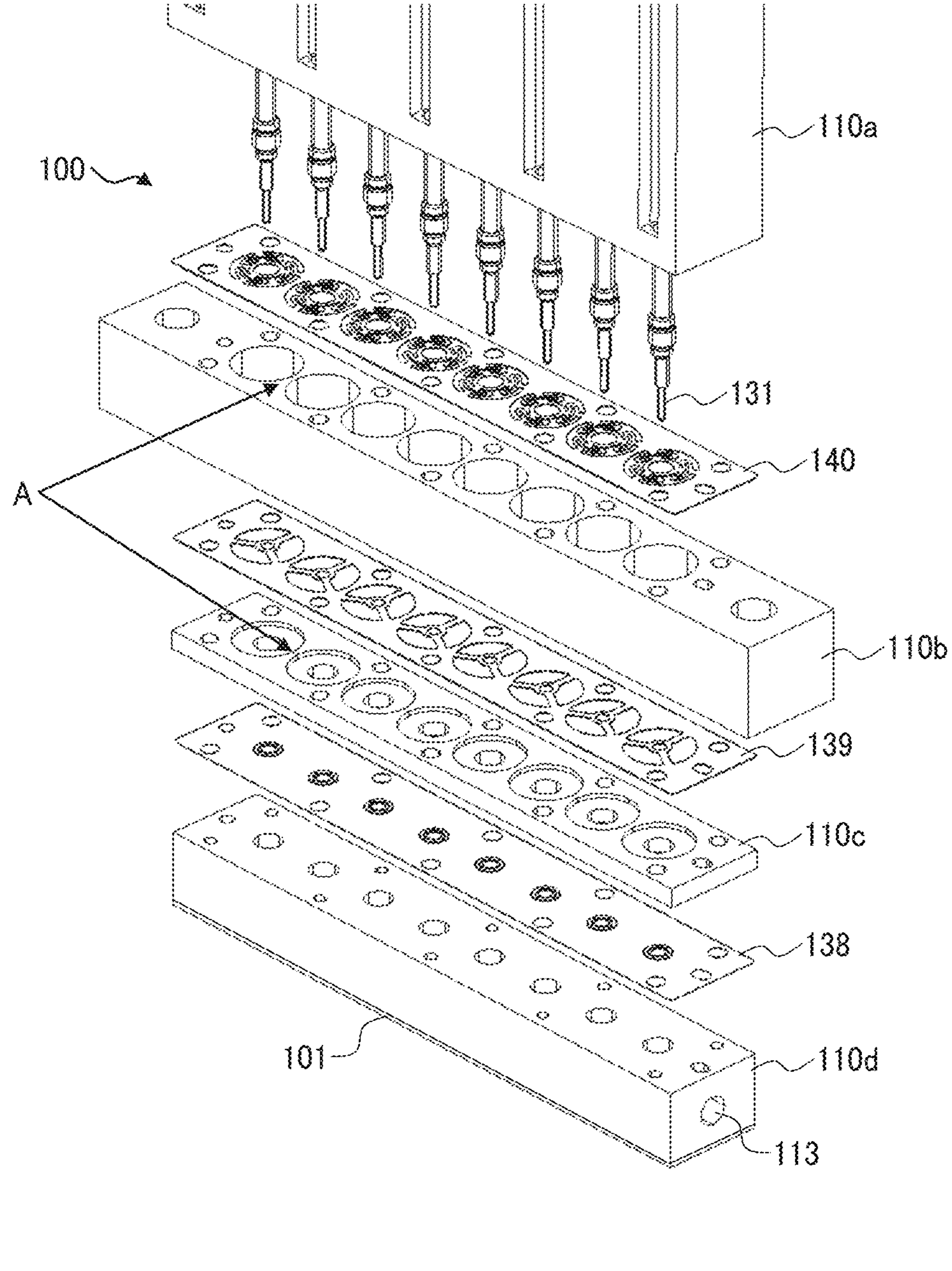
FIG. 19 is a perspective exploded view of main parts of an exemplary liquid discharge head including multiple nozzle holes.

Applied examples of a head will be described with FIGS. 19 to 24B. FIG. 19 is a perspective exploded view of main parts of an exemplary liquid discharge head including multiple nozzle holes.

The above embodiments have been each given based on the configuration of a head minimum unit (with a single nozzle). The present embodiment is not limited in configuration to a single-nozzle head. For example, as illustrated in FIG. 19, multiple needle valves 131 (eight needle valves 131 in the present example) may be supported by and housed in common first, second, third, and fourth housings 110_a_, 110_b_, 110_c_, and 110_d_. The members are similar in configuration and function to members in the third embodiment and thus are denoted with the same reference signs and descriptions thereof will be omitted.

With the multiple needle valves 131, the second housing 110_b_ and the third housing 110_c_ are in contact with the portion out of beam-structure patterns of a positional restraint film 139. The second housing 110_b_ and the third housing 110_c_ support the positional restraint film 139. In this case, the second housing 110_b_ and the third housing 110_c_ support not only the periphery of the positional restraint film 139 but also the portion between each adjacent beam-structure pattern as indicated with arrows A.

Similarly, the first housing 110_a_ and the second housing 110_b_ are in contact with the portion out of beam-structure patterns of a positional restraint film 140. The first housing 110_a_ and the second housing 110_b_ support the positional restraint film 140. In this case, the first housing 110_a_ and the second housing 110_b_ support not only the periphery of the positional restraint film 140 but also the portion between each adjacent beam-structure pattern.

As above, the positional restraint films 139 and 140 are each secured to a housing 110 such that each individual beam-structure pattern is sectioned. The positional restraint films 139 and 140 each have a region, excluding a region flexible due to movement of each needle valve 131 for separation or contact, secured to the housing 110 in contact. Thus, in a case where one needle valve 131 is driven from among the multiple needle valves 131, the force of the driven needle valve 131 hardly propagates in the positional restraint films 139 and 140. Then, since the force hardly propagates in the positional restraint films 139 and 140, the force hardly propagates to an adjacent needle valve 131, so that the needle valve 131 can be inhibited from positional misalignment or from slanting.

Figure 20:
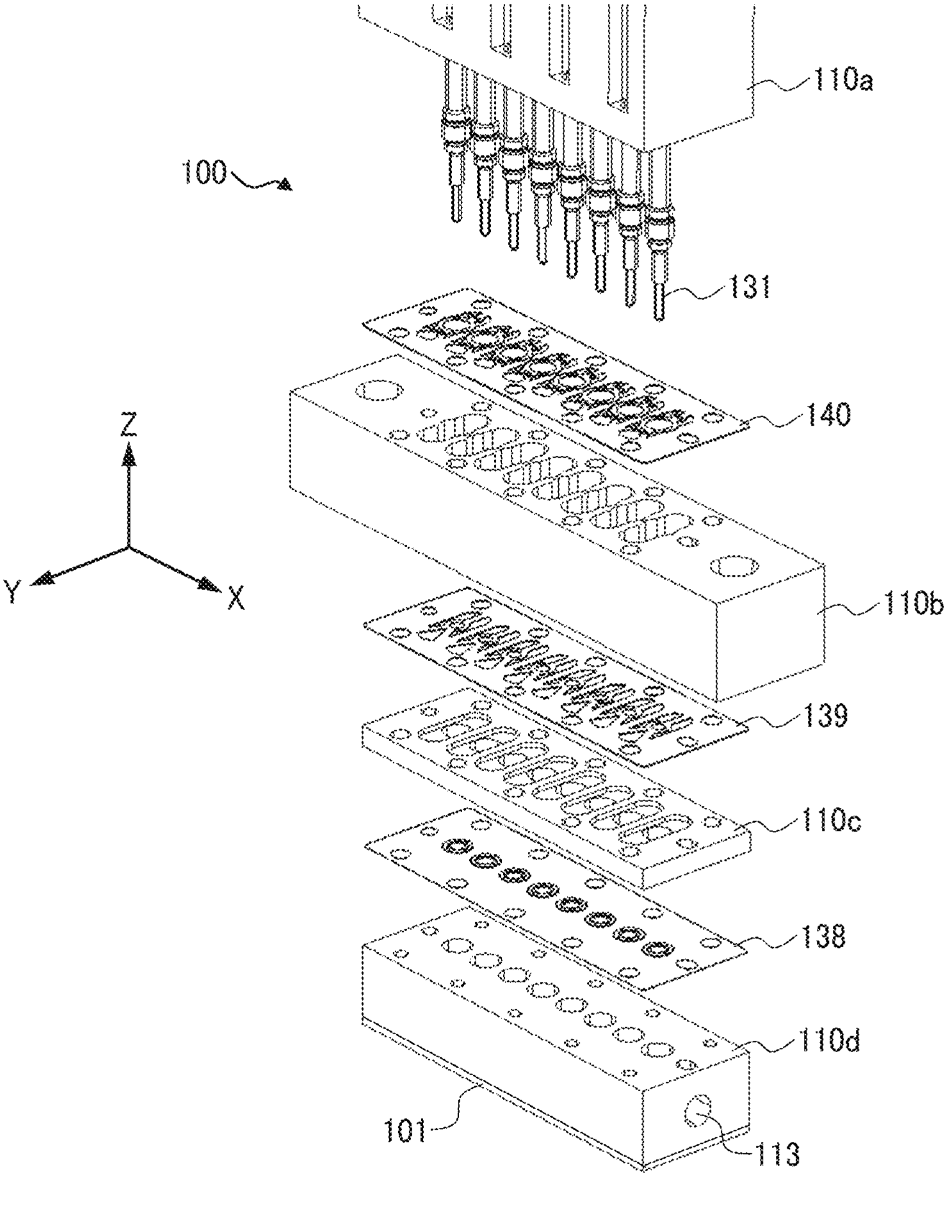
FIG. 20 is a perspective exploded view of main parts of another exemplary liquid discharge head including multiple nozzle holes.

FIG. 20 is a perspective exploded view of main parts of another exemplary liquid discharge head including multiple nozzle holes.

The head illustrated in FIG. 20 is different from the head illustrated in FIG. 19 in that positional restraint films 139 and 140 each have beam-structure patterns shortened in the X direction as a layout.

In the present example, the positional restraint films 139 and 140 are each secured to a housing 110 such that each individual beam-structure pattern is sectioned.

Therefore, in a case where one needle valve 131 is driven from among multiple needle valves 131, the force of the driven needle valve 131 hardly propagates in the positional restraint films 139 and 140. Thus, the force hardly propagates to an adjacent needle valve 131, so that the needle valve 131 can be inhibited, for example, from positional misalignment. The positional restraint films 139 and 140 are illustrated in detail in FIG. 21.

Figure 21A:
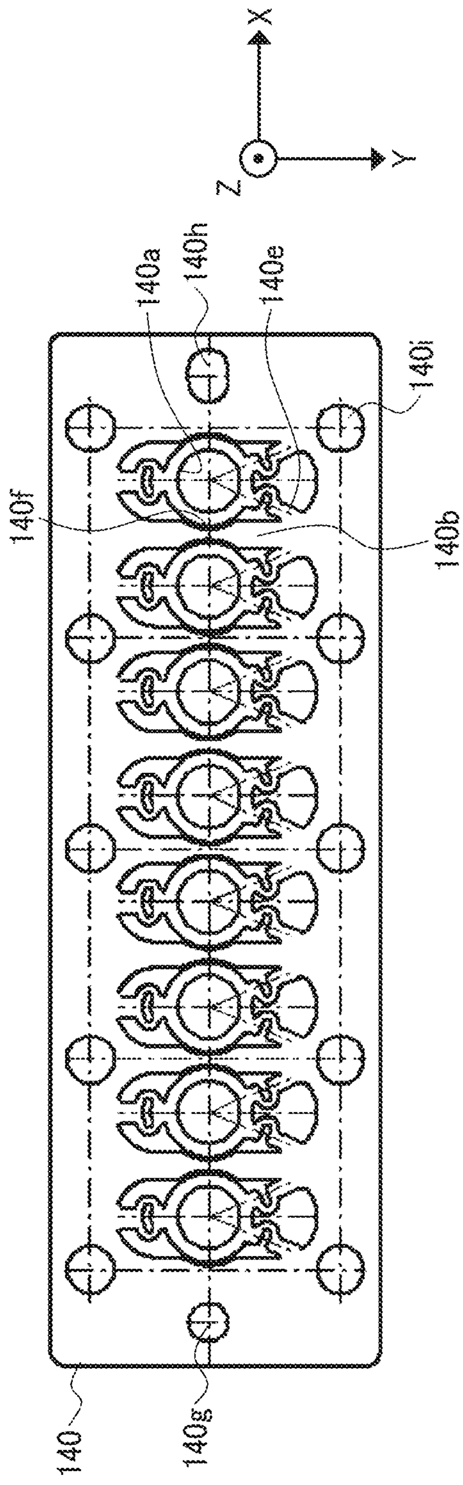
FIGS. 21A and 21B are plan views of positional restraint films.
Figure 21B:
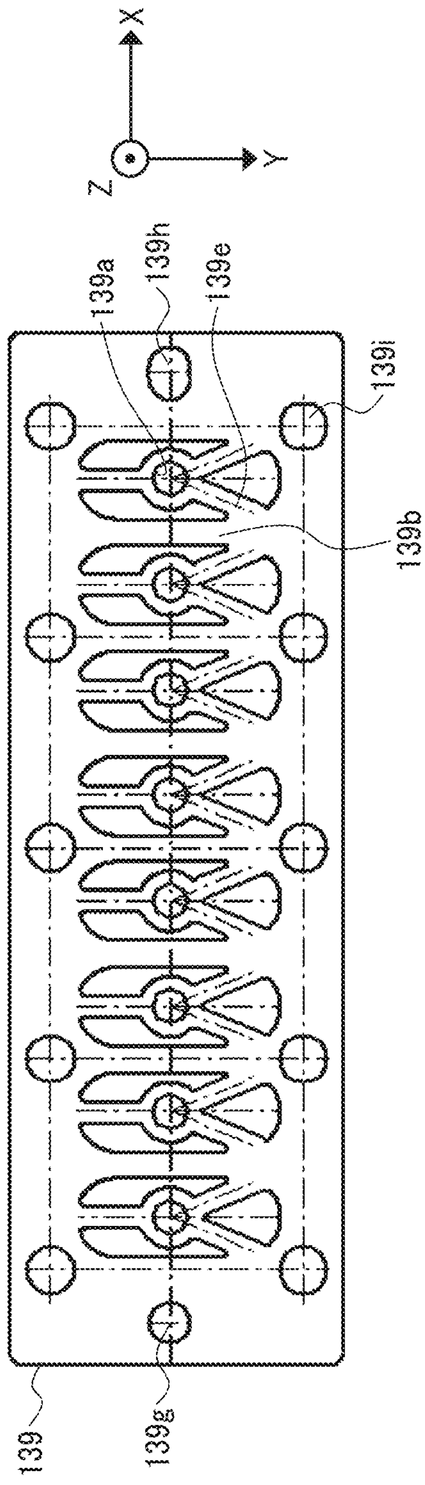

FIGS. 21A and 21B are plan views of positional restraint films. FIG. 21A is a plan view of the positional restraint film 140. FIG. 21B is a plan view of the positional restraint film 139.

The positional restraint film 140 is provided with eight needle-valve fitting holes 140*a* for insertion of eight needle valves 131. Each needle-valve fitting hole 140*a* fits the outer circumference of the corresponding needle valve 131 to support the corresponding needle valve 131. The needle-valve fitting holes 140*a* are each coupled to a rim 140*b* partially through a beam 140*e* including multiple beams around the needle-valve fitting hole 140*a*. Such beam-structure patterns as above, of which the number is identical to the number of needle valves 131, are shortened in the X direction as a layout on a single positional restraint film 140.

Since the present beam-structure patterns are shortened in the X direction as a layout, the quantity of space formable in the X direction is limited. Thus, each needle-valve fitting hole 140*a* and the rim 140*b* are separated by a slit 140*f* out of the beam 140*e* in the X direction on the positional restraint film 140 in the present example. Thus, even with the layout shortened in the X direction, the positional restraint film 140 can bend easily in the Z direction.

Positioning holes 140*g* and 140*h* and multiple screw holes 140*i* are provided around the beam-structure patterns. Such positioning holes and screw holes are further provided at the corresponding positions of the positional restraint film 139 and the housing 110. Each member is positioned with the positioning holes and is screwed with the screw holes.

The positional restraint film 139 is similar in configuration to the positional restraint film 140 except that no slit 140*f* is provided, and thus members in the positional restraint film 139 in correspondence relationship with members in the positional restraint film 140 are denoted with the same alphabets and descriptions thereof will be omitted.

As above, a layout is made such that beam-structure patterns are shortened in the X direction, enabling a shorter pitch of mounting of needle valves 131, leading to a reduction in the size of a head 100.

Figure 22:
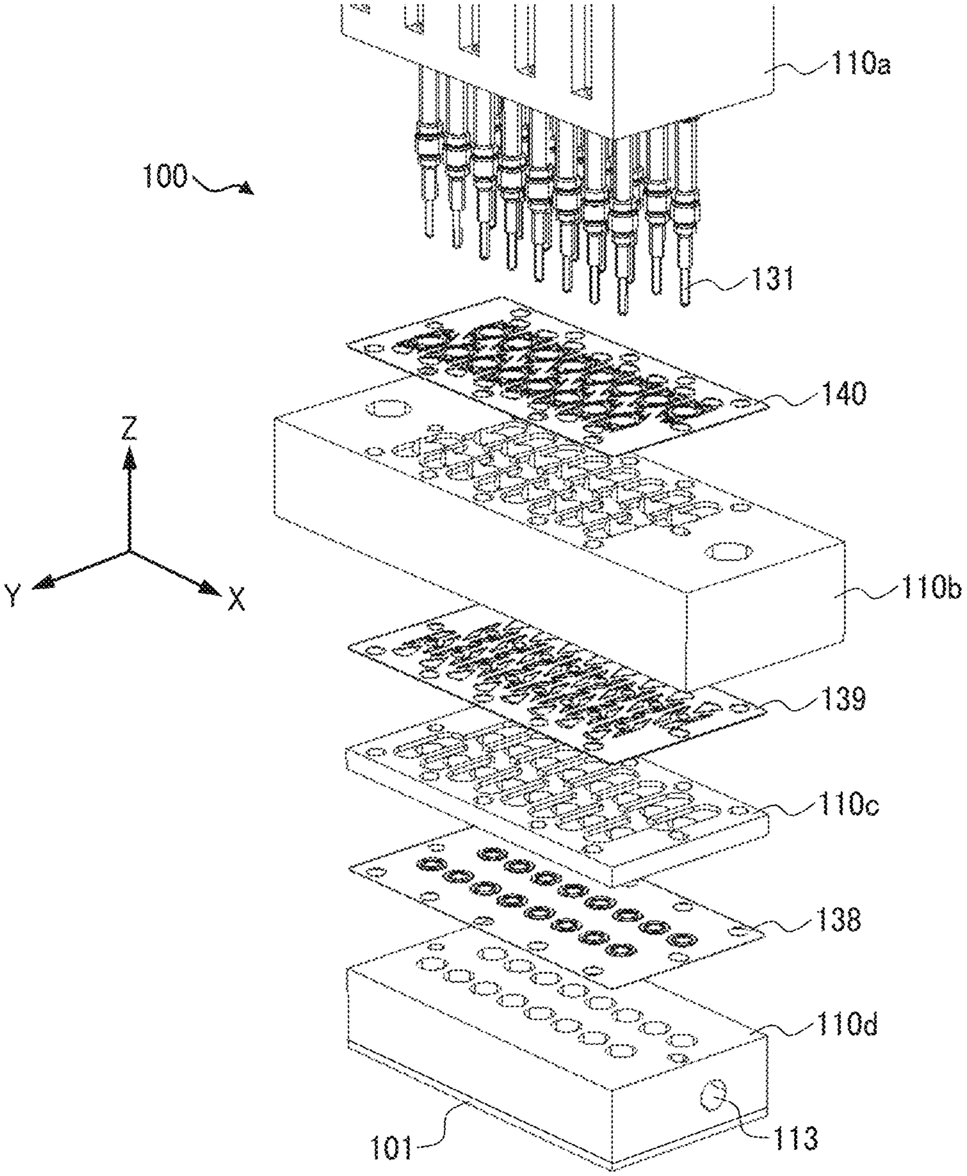
FIG. 22 is a perspective exploded view of main parts of anther exemplary liquid discharge head including multiple nozzle holes.

FIG. 22 is a perspective exploded view of main parts of another exemplary liquid discharge head including multiple nozzle holes.

The head illustrated in FIG. 22 is different from the heads illustrated in FIGS. 19 and 20 in that positional restraint films 139 and 140 each have beam-structure patterns laid out in multiple rows in the Y direction. That is, the head illustrated in FIG. 22 has needle valves 131 arrayed zigzag. In the present example, basically, the positional restraint films 139 and 140 are secured to a housing 110 such that each individual beam-structure pattern is sectioned.

Therefore, in a case where one needle valve 131 is driven from among the multiple needle valves 131, the force of the driven needle valve 131 hardly propagates in the positional restraint films 139 and 140. Thus, the force hardly propagates to an adjacent needle valve 131, so that the needle valve 131 can be inhibited, from example, from positional misalignment. The positional restraint films 139 and 140 are illustrated in detail in FIG. 23.

The liquid discharge head includes: multiple nozzle holes having the nozzle hole; multiple liquid chambers having the liquid chamber, multiple liquid chambers respectively in communication with the multiple nozzle holes; multiple needle valves including the needle valve, the multiple needle valves respectively open or close the multiple nozzle holes; multiple drivers including the driver to respectively move the multiple needle valves in the discharge direction; the housing having: the multiple liquid chambers; and multiple housing chambers including the housing chamber, the multiple housing chambers respectively housing the multiple needle valves and the multiple drivers. The sheet member includes: multiple inner circumferences respectively fitted to outer circumferences of the multiple needle valves; and multiple rims including the rim secured to the housing.

Figure 23A:
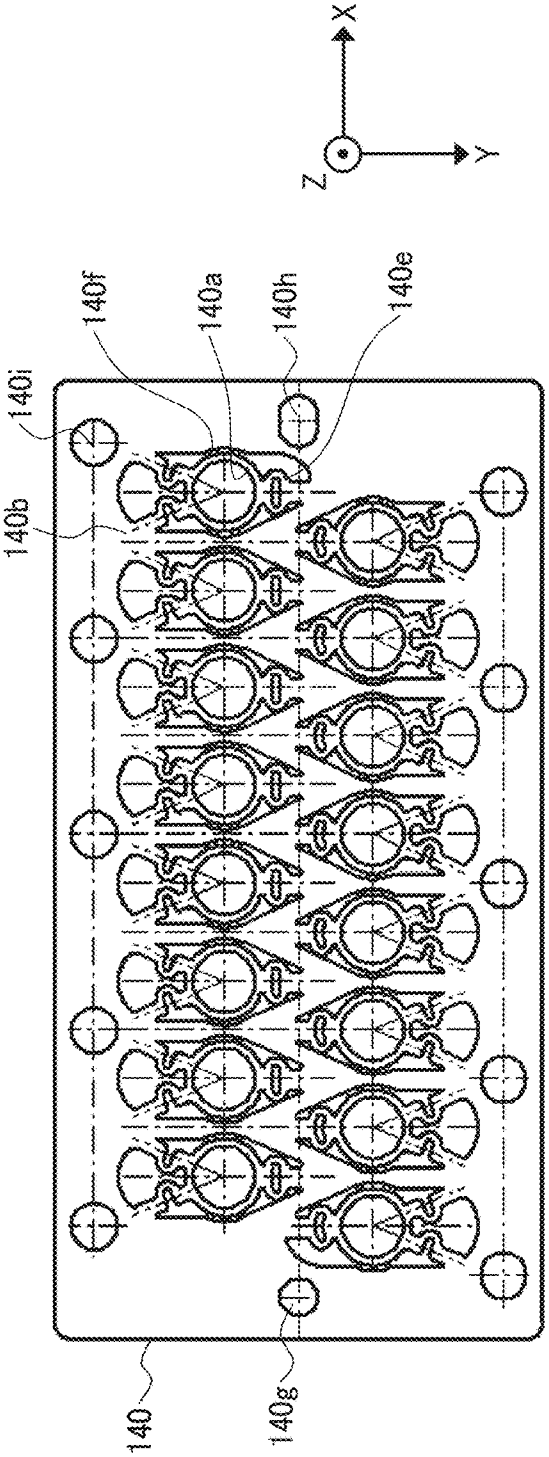
FIGS. 23A and 23B are plan views of positional restraint films.
Figure 23B:
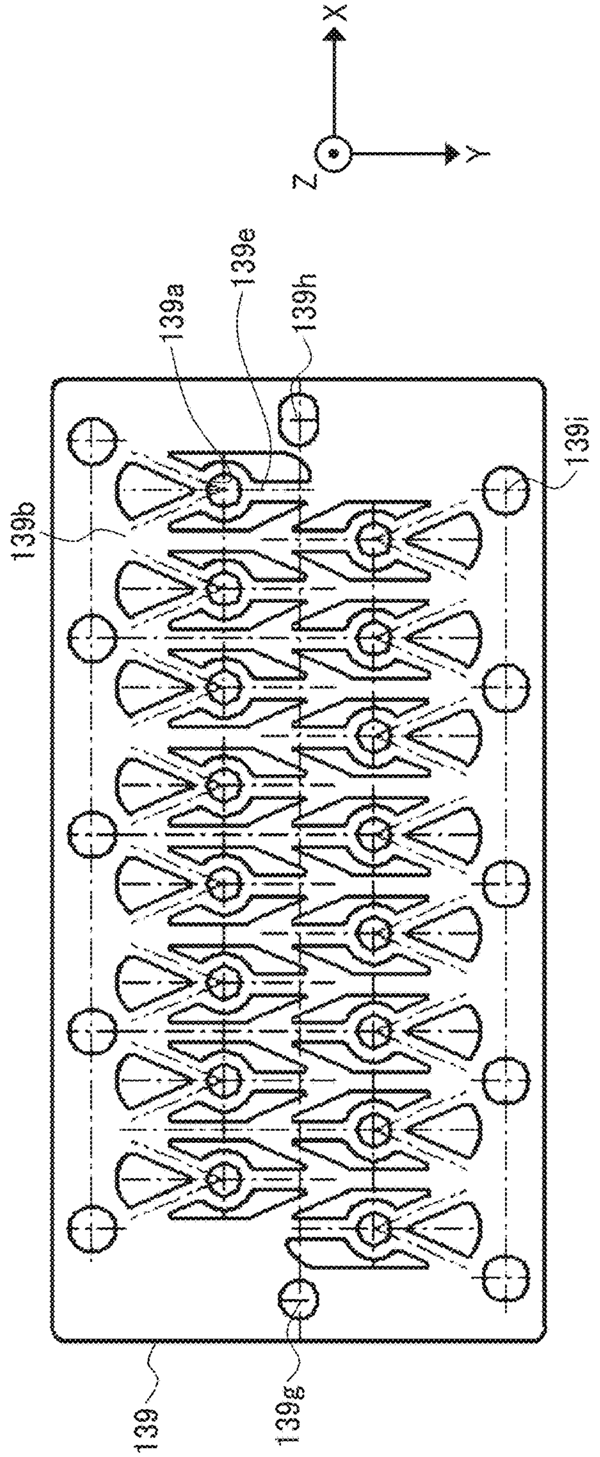

FIGS. 23A and 23B are plan views of the positional restraint films of FIG. 22. FIG. 23A is a plan view of the positional restraint film 140. FIG. 23B is a plan view of the positional restraint film 139.

As above, beam-structure patterns are arrayed zigzag, enabling a shorter pitch of mounting of needle valves 131, leading to achievement of a small-sized and high-resolution head. Note that the number of needle valves 131 to be mounted and the array of needle valves 131 to be mounted are exemplary. The number of needle valves 131 to be disposed in the X direction may be less than 8 or more than 8. The number of rows in the Y direction is not limited to 2 and thus may be 3 or more.

Figure 24B:
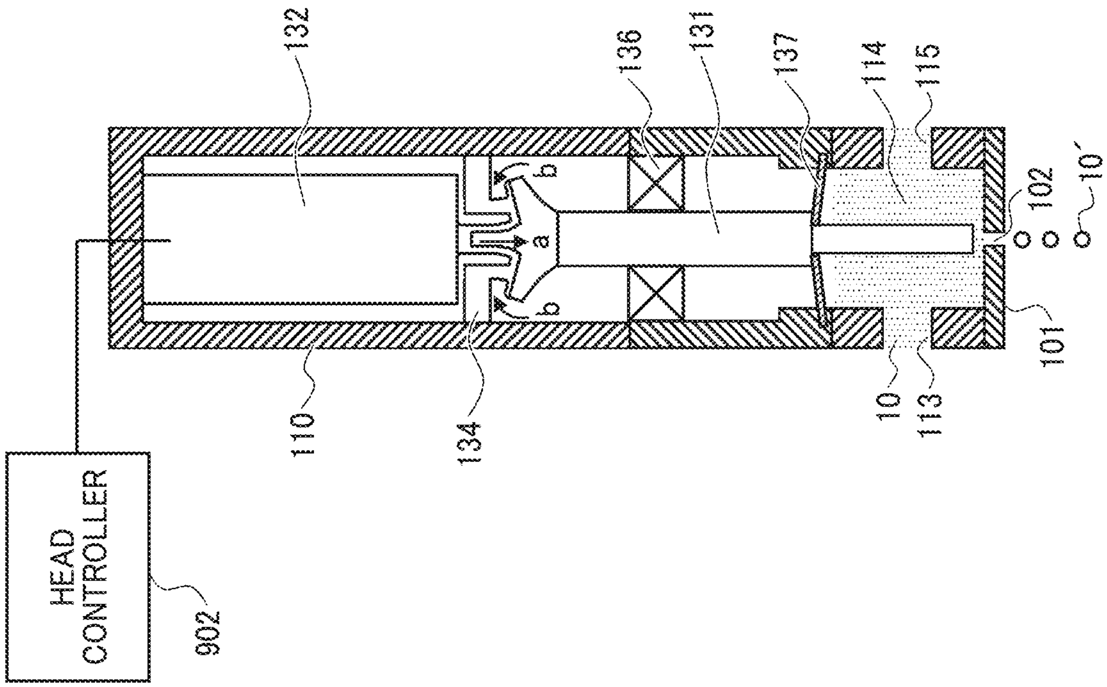
FIGS. 24A and 24B are schematic cross-sectional views of an exemplary configuration of a head unit according to another embodiment.
Figure 24A:
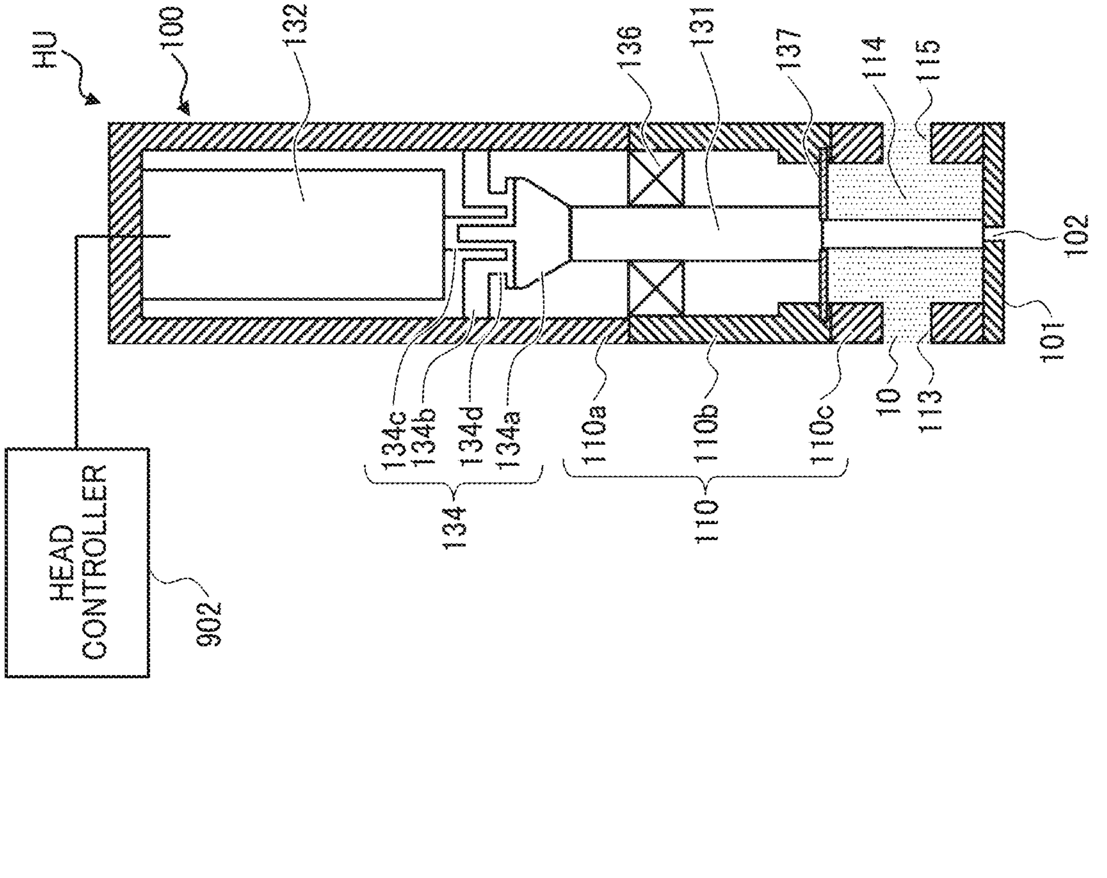

Next, the configuration of another head will be described with FIGS. 24A and 24B. FIGS. 24A and 24B are schematic cross-sectional views of an exemplary configuration of a head unit according to another embodiment and illustrate the configuration of a head minimum unit (with a single nozzle). FIG. 24A is a cross-sectional view of the head unit with a nozzle hole shut. FIG. 24B is a cross-sectional view of the head unit with the nozzle hole open.

The present exemplary configuration is different from the above head configuration in that a reverse spring mechanism 134 is provided between a needle valve 131 and a piezoelectric element 132. Therefore, the configuration and operation of the reverse spring mechanism 134 will be mainly described. Members similar in configuration and function to members in the above head are denoted with the same reference signs and descriptions thereof will be omitted. Note that, in the present exemplary configuration, the piezoelectric element 132 is elastic to extend toward a nozzle plate 101 in response to application of open voltage.

The reverse spring mechanism 134 is an elastic member formed by molding an appropriately deformable rubber, soft resin, or thin metal plate. The reverse spring mechanism 134 includes a deformable portion 134*a*, a fixed portion 134*b*, a guide 134*c*, and a bent side 134*d*.

The deformable portion 134*a* is substantially trapezoidal in cross-sectional view and abuts on the face of the base of the needle valve 131 (face of the upper end of the needle valve 131 in FIG. 24A). The fixed portion 134*b* is secured to the deformable portion 134*a* and the inner wall face of a first housing 110*a*. The guide 134*c* couples the fixed portion 134*b* and the piezoelectric element 132. The bent side 134*d* couples the longer side of the trapezoidal deformable portion 134*a* (corresponding to the bottom of a trapezoid) and the fixed portion 134*b*.

Regarding the reverse spring mechanism 134 having such a structure as above, the guide 134*c* is pressed toward a nozzle hole 102 (in the direction of an arrow a in FIG. 24B) in response to extension of the piezoelectric element 132 due to application of a predetermined open voltage to the piezoelectric element 132. Based on the force of the pressing, the deformable portion 134*a* is pulled in a direction away from the nozzle hole 102 (in the direction of arrows b in FIG. 24B). That is, a head including the reverse spring mechanism 134 is reverse to a head including no reverse spring mechanism 134 in terms of the direction of open/shut operation of the needle valve 131 to the polarity of application of driving voltage. The reverse spring mechanism 134 transforms the force of extension of the piezoelectric element 132 into the force of pulling the needle valve 131 and then transmits the force to the needle valve 131.

Regarding a head 100 according to the present exemplary configuration, the piezoelectric element 132 extends in response to application of voltage to the piezoelectric element 132. Based on the extension, the needle valve 131 opens the nozzle hole 102, so that a droplet 10' is discharged through the nozzle hole 102.

The head 100 including the reverse spring mechanism 134 as above can obtain large displacement from small displacement of the piezoelectric element 132, in comparison to a head including no reverse spring mechanism.

Liquid Discharge Apparatus

A liquid discharge apparatus to which any of the liquid discharge heads and the liquid discharge units described above is applied will be described below.

Application to Vehicle-Body Coating System

Figure 25:
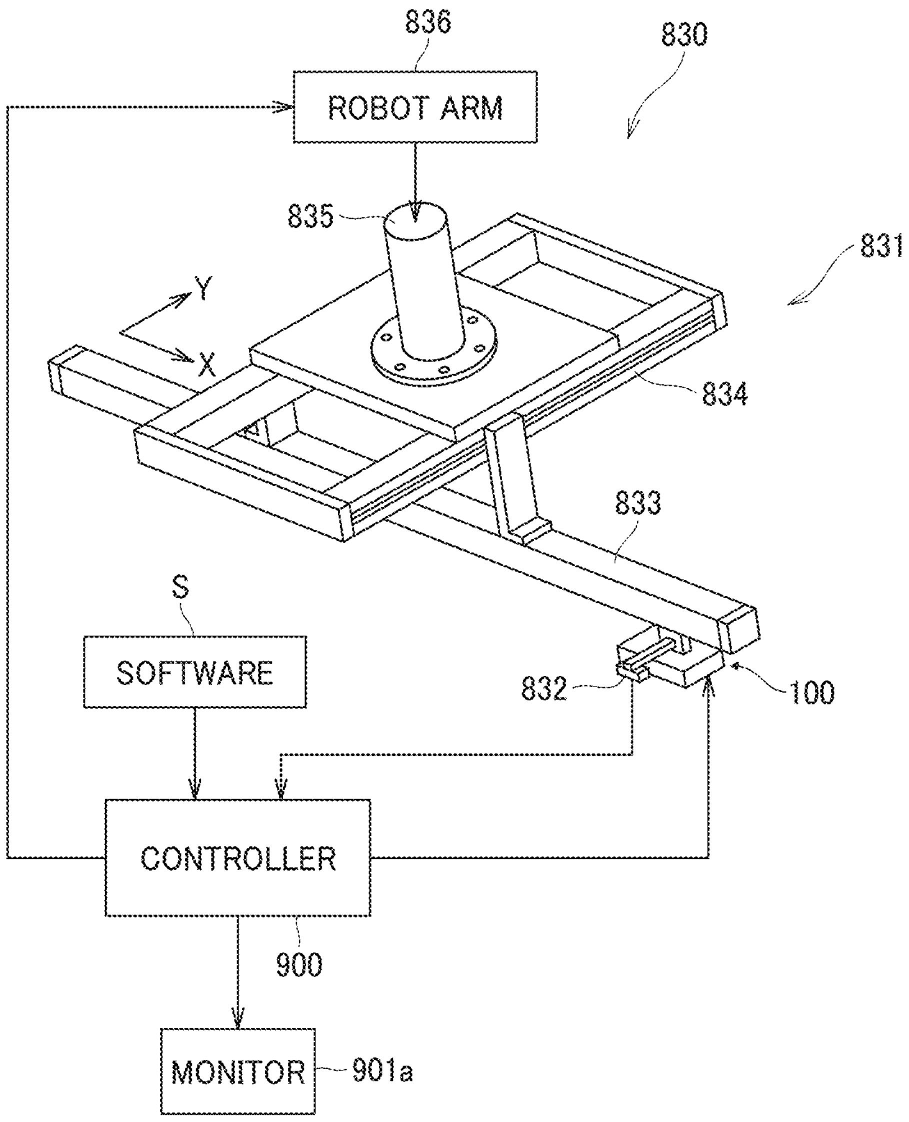
FIG. 25 is an explanatory view of an exemplary vehicle-body coating system.
Figure 26A:
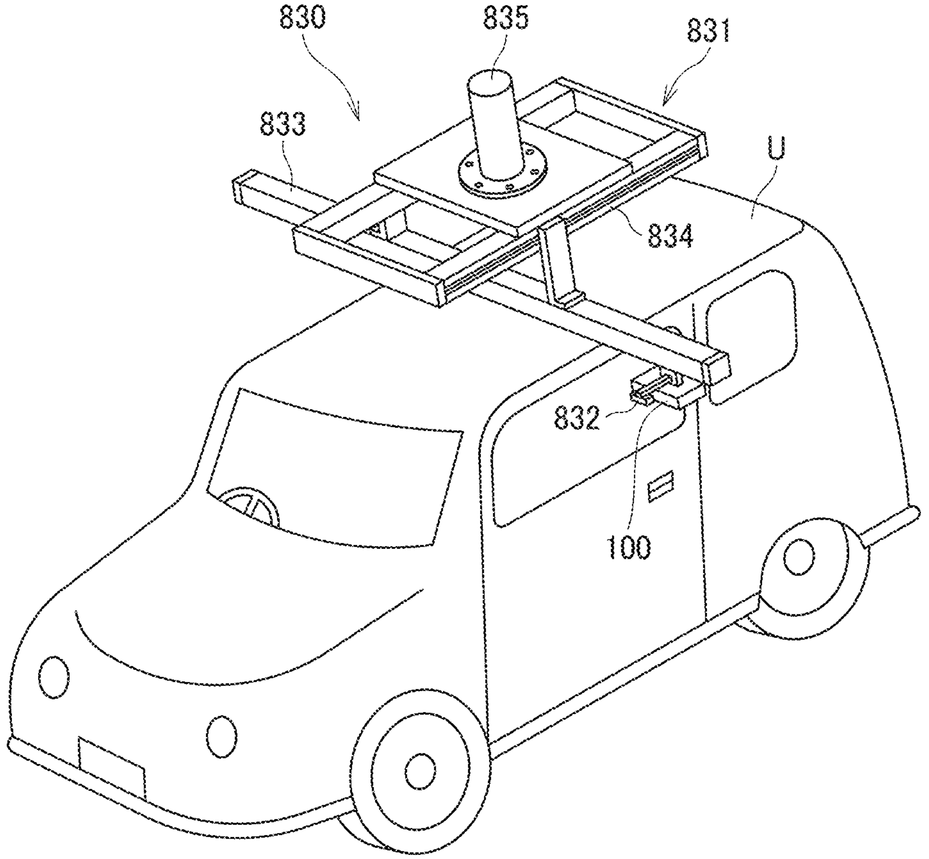
FIGS. 26A and 26B are explanatory views for usage examples of the vehicle-body coating system.
Figure 26B:
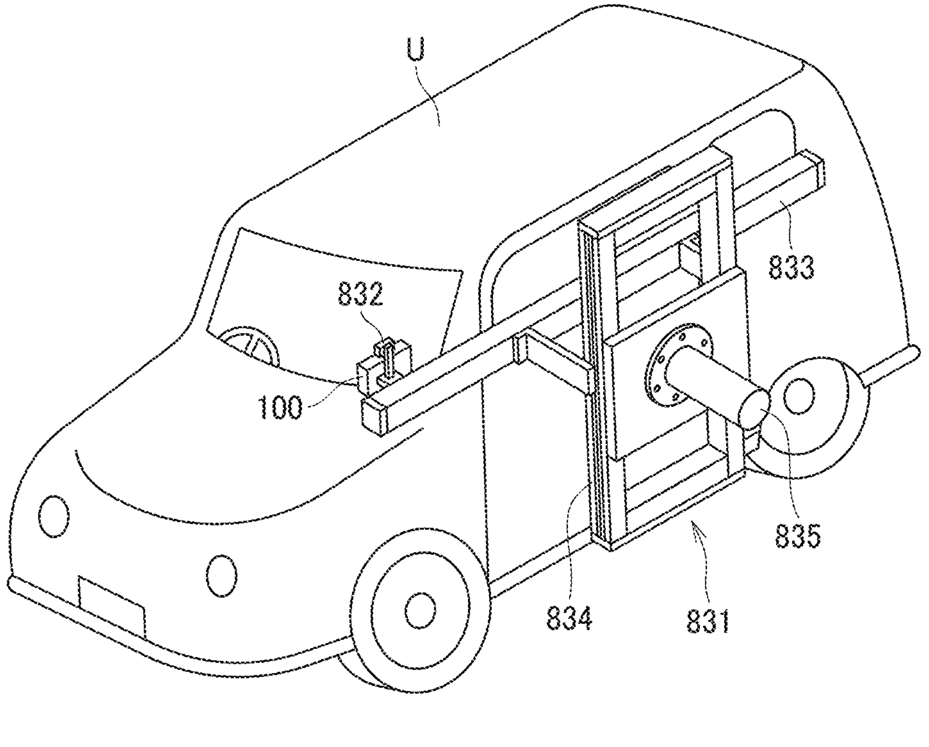

An exemplary liquid discharge apparatus as an application to a vehicle-body coating system will be described with FIGS. 25 to 26B. FIG. 25 is an explanatory view of an exemplary vehicle-body coating system. FIGS. 26A and 26B are explanatory views for usage examples of the vehicle-body coating system. FIG. 26A illustrates a first example of arrangement of the vehicle-body coating system to a coating target. FIG. 26B illustrates a second example of arrangement of the vehicle-body coating system to a coating target.

A vehicle-body coating system 830 includes at least one head 100, a camera 832 disposed near the head 100, an X-Y table 831 that moves the head 100 and the camera 832 in the X direction and in the Y direction, image editing software S for editing an image captured by the camera 832, a monitor 901*a* that displays, for example, an image to be edited, and a controller 900.

Based on a predetermined control program, the controller 900 operates the X-Y table 831 and additionally causes the head 100 to discharge liquid (e.g., coating material).

The vehicle-body coating system 830 can coat a coating target U with the coating material discharged from the head 100.

The head 100 discharges, through a nozzle hole 102, coating material to the coating target face of the coating target U.

Coating material is discharged from the nozzle hole 102 in the discharge direction substantially orthogonal to the XY plane.

The distance between the nozzle hole 102 and the coating target face of the coating target U is, for example, approximately 20 cm.

The X-Y table 831 includes an X-axis member 833 provided with a linear movement mechanism and a Y-axis member 834 that has two arms holding the X-axis member 833 and moves the X-axis member 833 in the Y direction. The X-axis member 833 corresponds to the rail 303 in FIG. 5. The head 100 and the camera 832 are attached to the head holding member 301 in FIG. 5. The Y-axis member 834 is provided with a shaft 835. Because the shaft 835 is held by a robot arm 836, the head 100 and the camera 832 can be freely disposed to the coating target U.

For example, in a case where the coating target U is a motor vehicle, the X-Y table 831 can be disposed above the coating target U as illustrated in FIG. 26A or can be disposed laterally to the coating target U as illustrated in FIG. 26B.

Note that the controller 900 controls, based on a predetermined program, the operation of the robot arm 836.

While moving together with the head 100 in the XY directions, the camera 832 captures, at regular minute intervals, a predetermined range of the coating target face of the coating target U. The camera 832 is, for example, a digital camera. In specifications of the camera 832, a lens or a resolution is appropriately selected such that multiple finely divided images resulting from division of the predetermined range of the coating target face can be captured. In accordance with a program with which the controller 900 is provided in advance, the camera 832 captures continuously and automatically multiple finely divided images of the coating target face.

As described above, since the vehicle-body coating system 830 includes the head 100, even for a long distance between the coating target U and the nozzle hole 102, coating material can be applied to a desired position on the coating target U with high accuracy. The head 100 can discharge coating material reliably. Thus, the vehicle-body coating system 830 can coat the coating target U with coating material with high accuracy.

Application to Printer

Figure 27:
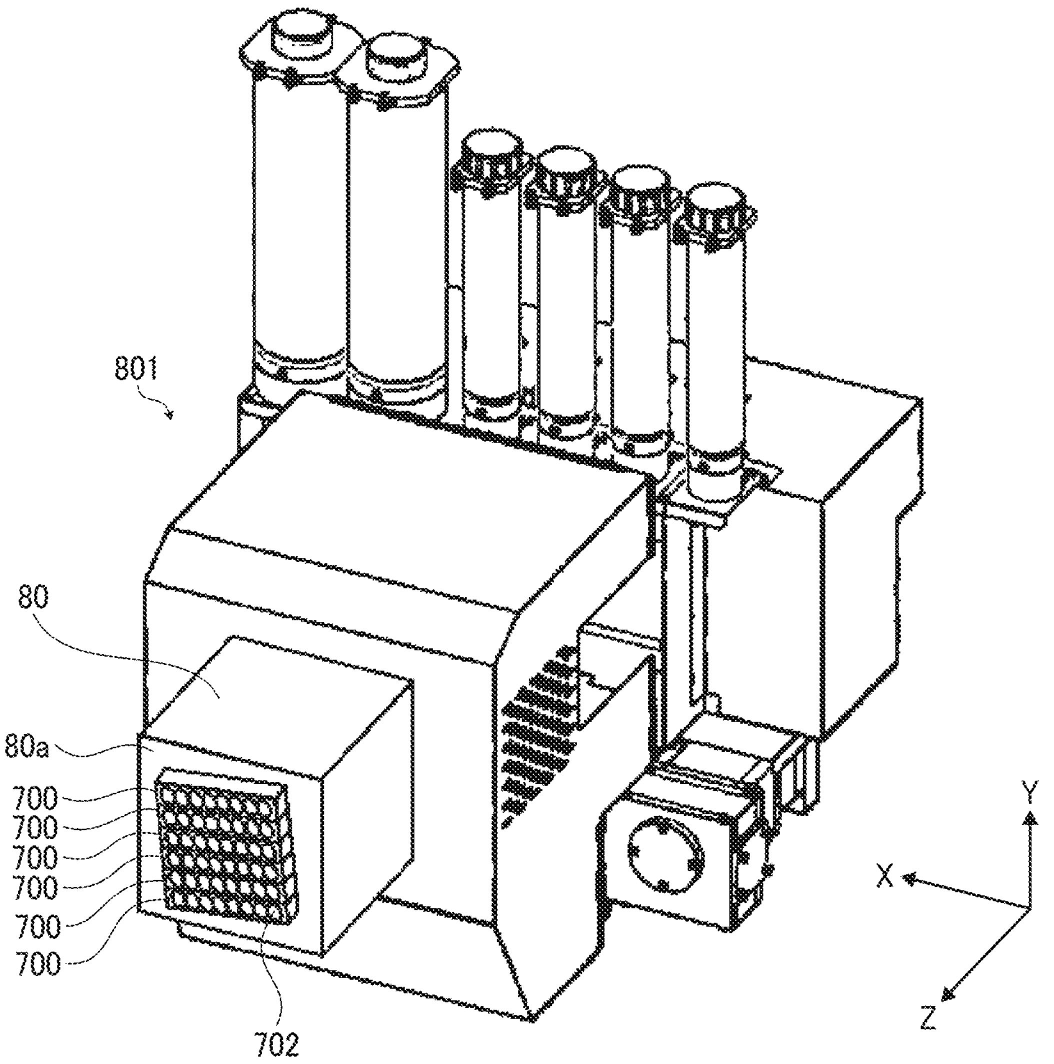
FIG. 27 is a perspective view of a carriage for a printer.
Figure 28:
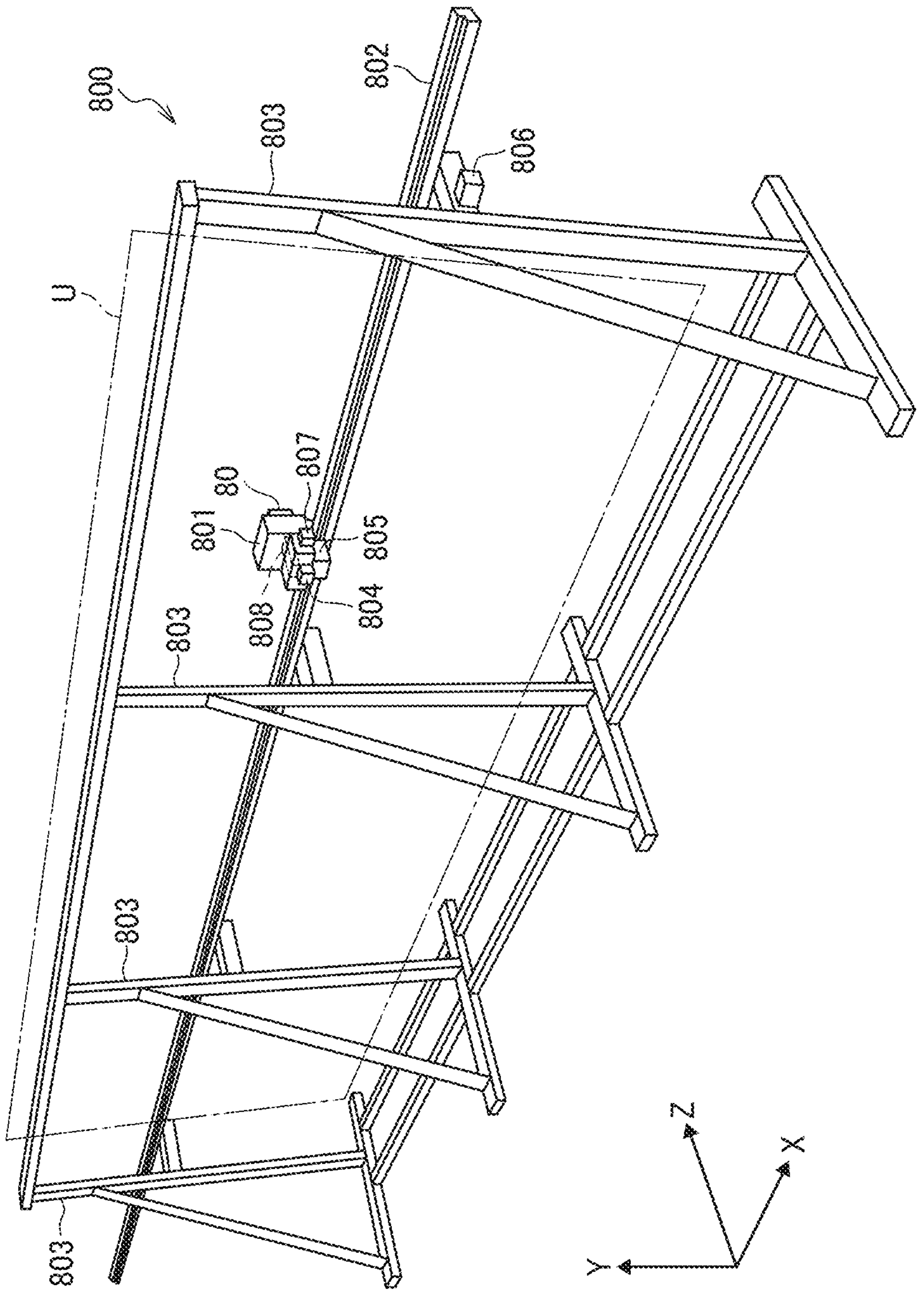
FIG. 28 is a perspective view of the entirety of an exemplary printer.

An exemplary liquid discharge apparatus as an application to a printer will be described with FIGS. 27 and 28. FIG. 27 is a perspective view of a carriage for a printer. FIG. 28 is a perspective view of the entirety of an exemplary printer equipped with the carriage of FIG. 27. Note that FIG. 27 corresponds to a case where a carriage 801 with which a printer 800, illustrated in FIG. 28, is equipped is viewed from the side of location of a coating target U.

The carriage 801 includes a head holding body 80. The carriage 801 can move along a Z-axis rail 804 in the Z direction (positively or negatively) due to power from a first Z-direction driver 807 of the printer 800 to be described later.

The head holding body 80 can move in the Z direction (positively or negatively) relative to the carriage 801 due to power from a second Z-direction driver 808 of the printer 800 to be described later. The head holding body 80 includes a head securing plate 80*a* for attachment of ahead module 700. The carriage 801 is an exemplary holder. Such a liquid discharge head including multiple nozzle holes as illustrated in FIG. 19 or 20 is referred to as a head module for convenience in the present example.

In the present application, exemplified is a configuration in which such liquid discharge heads (head modules) each including multiple nozzle holes as illustrated in FIG. 19 or 20, of which the number is six, are attached to the head securing plate 80*a*. Six head modules 700 are provided one on another in layers.

The head modules 700 each include multiple nozzle holes 702. Note that the color of coating material to be used in each head module 700 may be different from each other or may be identical to each other. For example, in a case where the printer 800 is monochromatic, the color of coating material to be used in each head module 700 may be identical to each other. The number of head modules is not limited to six. The number of head modules may be more than six or less than six. With such a zigzag array as illustrated in FIG. 22, for example, the number of nozzles for six head modules may be implemented by five head modules or less.

As illustrated, the head modules 700 are each secured to the head securing plate 80*a* such that a nozzle array (an array of eight nozzle holes 702) is at an angle with respect to the horizontal plane (XZ plane), that is, the direction in which the multiple nozzle holes 702 is arrayed is at an angle with respect to the X axis. In the state, a droplet is discharged from each nozzle hole 702 in a direction intersecting the direction of gravity (positively in the Z direction).

The printer 800 illustrated in FIG. 28 is installed facing a coating target U. The printer 800 includes an X-axis rail 802, a Y-axis rail 803, and a Z-axis rail 804. The Y-axis rail 803 intersects the X-axis rail 802, and the Z-axis rail 804 intersects the X-axis rail 802 and the Y-axis rail 803.

The Y-axis rail 803 holds the X-axis rail 802 such that the X-axis rail 802 can move in the Y direction (positively or negatively). The X-axis rail 802 holds the Z-axis rail 804 such that the Z-axis rail 804 can move in the X direction (positively or negatively). Then, the Z-axis rail 804 holds the carriage 801 such that the carriage 801 can move in the Z direction (positively or negatively).

The printer 800 includes a first Z-direction driver 807 that moves the carriage 801 along the Z-axis rail 804 in the Z direction and an X-direction driver 805 that moves the Z-axis rail 804 along the X-axis rail 802 in the X direction. The printer 800 includes a Y-direction driver 806 that moves the X-axis rail 802 along the Y-axis rail 803 in the Y direction. Furthermore, the printer 800 includes a second Z-direction driver 808 that moves the head holding body 80 relative to the carriage 801 in the Z direction.

The printer 800 performs printing to the coating target U while moving the carriage 801 in the X, Y, or Z direction with the head modules 700, with which the head holding body 80 is provided, discharging coating material. Note that the movements in the Z direction of the carriage 801 and the head holding body 80 are not necessarily parallel to the Z direction and thus may be oblique, provided that at least a component in the Z direction is included.

Although the surface shape of the coating target U is illustrated as flat, the coating target U may have a nearly perpendicular face, a face having a large radius of curvature, or a slightly rough face, like the body of a car or truck or the body of an aircraft.

Application to Electrode Manufacturing Apparatus

Figure 29:
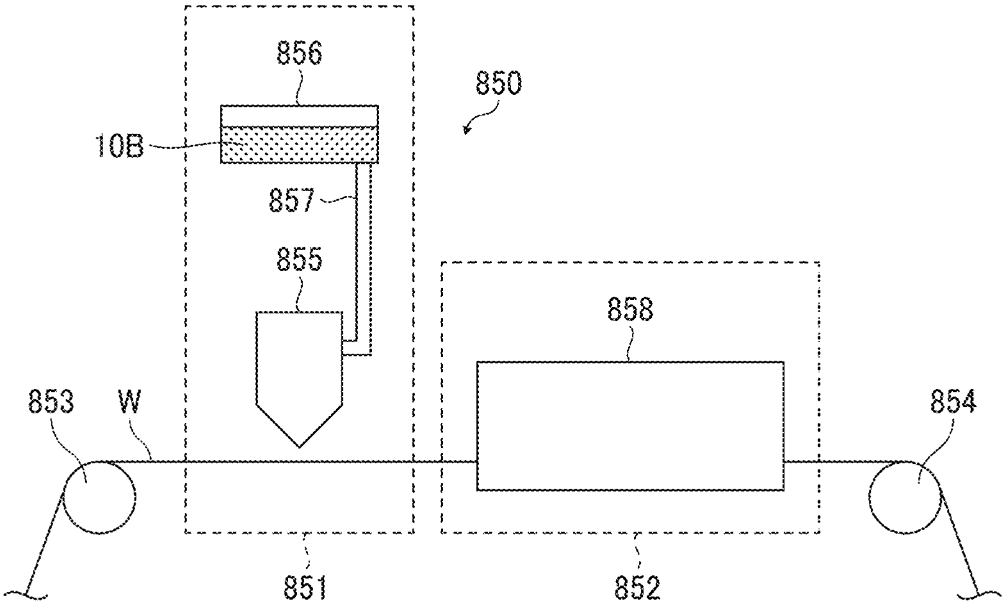
FIG. 29 is an explanatory view of an exemplary electrode manufacturing apparatus.

Next, an application to an electrode manufacturing apparatus will be described with FIG. 29. FIG. 29 is an explanatory view of an exemplary electrode manufacturing apparatus.

An electrode manufacturing apparatus 850 discharges, with such ahead 100 as described above, a liquid composition to manufacture an electrode including a layer containing electrode material.

The head 100 discharges the liquid composition onto a target to form a liquid composition layer. The target in this case is not particularly limited, provided that a layer containing electrode material can be formed. Thus, a target can be appropriately selected for any purpose. Examples of the target include an electrode base body (current collector), an active material layer, and a layer containing solid electrode material. Provided that a layer containing electrode material can be formed onto the target, the liquid composition may be discharged directly to the target or may be discharged indirectly to the target.

The electrode manufacturing apparatus includes, as a constituent, a heater. The heater heats the liquid composition discharged from the head 100. The liquid composition layer can be dried by heating. FIG. 29 illustrates an exemplary electrode manufacturing apparatus that forms an electrode composite layer containing active material onto an electrode base body (current collector).

The electrode manufacturing apparatus 850 includes a discharging process unit 851 that carries out a process to apply a liquid composition onto a printing base W having a target to form a liquid composition layer and a heating process unit 852 that carries out a heating process to heat the liquid composition layer to obtain an electrode composite layer.

The electrode manufacturing apparatus 850 includes conveyers 853 and 854 that convey the printing base W. The conveyers 853 and 854 convey the printing base W to the discharging process unit 851 and the heating process unit 852 in this order at a previously set rate. As a method for producing the printing base W having the target, such as an active material layer, any publicly known method can be appropriately selected.

The discharging process unit 851 includes a printer 855 that carries out an applying process to apply the liquid composition onto the printing base W, a housing container 856 that houses the liquid composition, and a supply tube 857 that supplies the printer 855 with the liquid composition stored in the housing container 856. The printer 855 includes such a head 100 as described above.

The housing container 856 houses a liquid composition 10B. The discharging process unit 851 discharges the liquid composition 10B from the head 100 included in the printer 855 to apply the liquid composition 10B onto the printing base W, followed by formation of a liquid composition layer like a thin film. Note that the housing container 856 may be integrated with the electrode manufacturing apparatus 850 or may be detachable from the electrode manufacturing apparatus 850. The housing container 856 integrated with the electrode manufacturing apparatus 850 or detachable from the electrode manufacturing apparatus 850 may be a container for addition. As the housing container 856, any container can be selected, provided that the liquid composition 10B can be stored reliably. As the supply tube 857, any tube can be selected, provided that the liquid composition 10B can be supplied reliably.

The heating process unit 852 includes a heater 858 and carries out a solvent removal process to cause the heater 858 to heat, dry, and remove any solvent remaining in the liquid composition layer. Thus, an electrode composite layer can be formed. The heating process unit 852 may carry out the solvent removal process under decompression.

As the heater 858, a heater can be appropriately selected for any purpose. Examples of the heater 858 include, but not particularly limited to, a substrate heater, an infrared (IR) heater, a fan heater, and any combination thereof. Heating temperature and heating time can be appropriately selected in accordance with the boiling point of the solvent in the liquid composition 10B or the thickness of a film to be formed.

The electrode composite layer formed as above can be favorably used, for example, as a constituent of an electrochemical element. Such an electrochemical element includes, but not particularly limited to, a positive electrode, a negative electrode, and a separator that are publicly known, in addition to the electrode composite layer.

Supplementary Notes

In the present embodiment, the "liquid discharge apparatus" includes a liquid discharge head and drives the liquid discharge head to discharge liquid. Examples of such a liquid discharge apparatus include an apparatus that can discharge liquid to a medium to which the liquid can adhere and an apparatus that discharges liquid into gas or liquid.

The "liquid discharge apparatus" can include a feeder, a conveyer, and an ejector for a medium to which liquid can adhere, a pre-treatment device, and a post-treatment device. Examples of the "liquid discharge apparatus" include an image forming apparatus that discharges ink to a sheet to form an image on the sheet and a three-dimensional fabrication apparatus that discharges fabrication liquid to a powder layer in which powder material is layered, in order to fabricate a three-dimensional fabrication object.

The "liquid discharge apparatus" is not limited to an apparatus that discharges liquid to visualize a meaningful image, such as a character or a figure. Examples of the "liquid discharge apparatus" include an apparatus that forms a meaningless pattern and an apparatus that fabricates a meaningless three-dimensional image.

The "medium to which liquid can adhere" described above corresponds to a medium to which liquid can adhere at least temporarily, such as a medium to which liquid fastens after adhering to or a medium into which liquid permeates after adhering to. Specific examples of the medium to which liquid can adhere include recording media, such as a sheet, recording paper, a recording sheet, a film, and cloth, electronic components, such as an electronic substrate and a piezoelectric element, and media, such as a powder layer, an organ model, and a testing cell. Unless otherwise particularly limited, any media to which liquid adheres are included.

The material of the "medium to which liquid can adhere" described above may be any material to which liquid can adhere even temporarily, such as paper, thread, fiber, fabric, leather, metal, plastic, glass, wood, ceramic, a current collector, such as aluminum foil or copper foil, or an electrode including a current collector on which an active material layer is formed.

The "liquid" may have any viscosity or surface tension, provided that the liquid can be discharged from ahead. Such liquid is preferably, but not particularly limited to, not more than 30 mPa·s in viscosity at normal temperature and normal pressure or due to heating or cooling. More specific examples of the liquid include a solution, a suspension, and an emulsion that contain a solvent, such as water or an organic solvent, a colorant, such as dye or pigment, a functional material, such as a polymerizable compound, resin, or a surfactant, a biocompatible material, such as deoxyribonucleic acid (DNA), an amino acid, protein, or calcium, an edible material, such as a natural pigment, active material or solid electrolyte used as electrode material, ink containing conductive material or insulating material. Such a solution, a suspension, or an emulsion can be used, for example, for coating material for painting, inkjet ink, surface treatment liquid, liquid for formation of a constituent element in an electronic element or light-emitting element, liquid for formation of a resist pattern for an electronic circuit, material liquid for three-dimensional fabrication, an electrode, or an electrochemical element.

The "liquid discharge apparatus" may be, but not limited to, an apparatus in which a liquid discharge head and a medium to which liquid can adhere move relatively. Specific examples of such an apparatus include a serial head apparatus that moves a liquid discharge head and a line head apparatus that does not move a liquid discharge head.

Examples of the "liquid discharge apparatus" further include a treatment-liquid coating apparatus that discharges, for the purpose of reforming the surface of a sheet, treatment liquid to a sheet to coat the surface of the sheet with the treatment liquid, and a jet granulation apparatus that jets, through a nozzle, a composition liquid including row material dispersed in a solution to granulate fine particles of the row material.

The "liquid discharge apparatus" is not limited to a stationary apparatus. The liquid discharge apparatus may be, for example, a robot equipped with a liquid discharge head and movable based on remote control or autonomous traveling. Such a movable robot enables applications to coat an external wall of a building or painting for markings on a road (e.g., a crosswalk, a stop line, and a speed limit mark). In this case, such a building and a road are examples of the "medium to which liquid can adhere".

The above description is exemplary, and the following aspects of the present embodiment have respective particular effects.

Aspect 1

According to Aspect 1, a liquid discharge head (e.g., a head 100) includes: a liquid chamber (e.g., a liquid chamber 114) that houses liquid; a nozzle hole (e.g., a nozzle hole 102) in communication with the liquid chamber, the nozzle hole allowing the liquid to be discharged; a needle valve (e.g., a needle valve 131) configured to move for separation from or contact with the nozzle hole to open or shut the nozzle hole; a driver (e.g., a piezoelectric element 132) configured to cause the needle valve to move for separation or contact; a housing (e.g., a housing 110) including the liquid chamber and a housing chamber (e.g., a housing chamber 116) that houses the needle valve and the driver; and a positional restraint member (e.g., a sealing/positional restraint film 137) sheet-shaped, the positional restraint member having flexibility in a direction in which the needle valve moves for separation or contact, the positional restraint member including: an inner circumference (e.g., a needle-valve fitting hole 137*a*) fitting an outer circumference of the needle valve; and a rim (e.g., a rim 137*b*) secured to the housing, the positional restraint member restricting a position of the needle valve in a transverse direction (e.g., the XY direction) orthogonal to a discharge direction in which the needle valve moves for separation or contact (e.g., the Z direction), in which the needle valve is supported in the housing chamber through the positional restraint member.

Aspect 2

According to Aspect 2, in the liquid discharge head of Aspect 1, the positional restraint member (e.g., a sealing/positional restraint film 137) has sealability to prevent the liquid from entering from the liquid chamber (e.g., a liquid chamber 114) to the housing chamber (e.g., a housing chamber 116).

Aspect 3

According to Aspect 3, the liquid discharge head of Aspect 1 or 2 further includes a second positional restraint member (e.g., a bearing 136 or a positional restraint film 140) located away opposite the liquid chamber across a first positional restraint member, as which the positional restraint member (e.g., a sealing/positional restraint film 137) is defined, in the direction in which the needle valve moves for separation or contact, the second positional restraint member restricting a position of the needle valve in a transverse direction orthogonal to the discharge direction in which the needle valve moves for separation or contact.

Aspect 4

According to Aspect 4, in the liquid discharge head of Aspect 3, the second positional restraint member (e.g., a positional restraint film 140) absorbs, in a case where the needle valve is located such that the nozzle hole is shut, positional misalignment in a direction perpendicular to the direction in which the needle valve moves for separation or contact.

Aspect 5

According to Aspect 5, the liquid discharge head of any of Aspects 1 to 3 further includes a sealing member (e.g., a sealing film 138) between the liquid chamber (e.g., a liquid chamber 114) and the positional restraint member (e.g., a positional restraint film 139), the sealing member having flexibility in the direction in which the needle valve moves for separation or contact and preventing the liquid from entering from the liquid chamber to the housing chamber, in which the sealing member includes: an inner circumference (e.g., a needle-valve fitting hole 138*a*) fitting the outer circumference of the needle valve; and a rim (e.g., a rim 138*b*) secured to the housing.

Aspect 6

According to Aspect 6, in the liquid discharge head of Aspect 5, the sealing member (e.g., a sealing film 138) has a portion facing the liquid chamber, and an area of the portion is smaller than an area of a flexible portion of the positional restraint member (e.g., a positional restraint film 139).

Aspect 7

According to Aspect 7, in the liquid discharge head of Aspect 2, the positional restraint member (e.g., a sealing/positional restraint film 137) has a corrugated cross section (e.g., a protrusion 137*c* or a recess 137*d*) ranging from the inner circumference (e.g., a needle-valve fitting hole 137*a*) to the rim (e.g., a rim 137*b*).

Aspect 8

According to Aspect 8, in the liquid discharge head of Aspect 5, the sealing member (e.g., a sealing film 138) has a corrugated cross section (e.g., a protrusion 138*c* or a recess 138*d*) ranging from the inner circumference (e.g., a needle-valve fitting hole 138*a*) to the rim (e.g., a rim 138*b*).

Aspect 9

According to Aspect 9, in the liquid discharge head of any of Aspects 1 to 8, the positional restraint member (e.g., a sealing/positional restraint film 137) includes, a fiber layer (e.g., a fiber layer 137-1); and a resin layer (e.g., a resin layer 137-2) including at least one of resin and rubber.

Aspect 10

According to Aspect 10, in the liquid discharge head of any of Aspects 1 to 8, the positional restraint member (e.g., a sealing/positional restraint film 137) includes a metal layer (e.g., a metal layer 137-3) and a resin layer (e.g., a resin layer 137-2) including at least one of resin and rubber, and the metal layer includes a beam (e.g., a beam 137*e*) coupling the inner circumference (e.g., a needle-valve fitting hole 137*a*) and the rim (e.g., a rim 137*b*) partially.

Aspect 11

According to Aspect 11, in the liquid discharge head of any of Aspects 1 to 8, the positional restraint member (e.g., a sealing/positional restraint film 137) includes multiple resin layers (e.g., the resin layer 137-2 and the metal layer 137-3) each including at least one of resin and rubber, and one of the multiple resin layers (e.g., the metal layer 137-3) includes a beam (e.g., a beam 137*e*) coupling the inner circumference (e.g., a needle-valve fitting hole 137*a*) and the rim (e.g., a rim 137*b*) partially.

Aspect 12

According to Aspect 12, in the liquid discharge head of Aspect 3, the second positional restraint member (e.g., a positional restraint film 140) is sheet-shaped, the second positional restraint member having flexibility in the direction in which the needle valve moves for separation or contact, the second positional restraint member including: an inner circumference (e.g., a needle-valve fitting hole 140*a*) fitting the outer circumference of the needle valve (e.g., a needle valve 131); a rim (e.g., a rim 140*b*) secured to the housing (e.g., a housing 110), and a beam (e.g., a beam 140*e*) coupling the inner circumference and the rim partially.

Aspect 13

According to Aspect 13, a liquid discharge head includes: a liquid chamber that houses liquid; multiple nozzles in communication with the liquid chamber, the multiple nozzles each allowing the liquid to be discharged; multiple needle valves corresponding one-to-one to the multiple nozzle holes, the multiple needle valves being each configured to move for separation from or contact with the corresponding nozzle hole to open or shut the corresponding nozzle hole; multiple drivers configured to cause, one-to-one, the multiple needle valves to move for separation or contact; a housing including the liquid chamber and multiple housing chambers that houses one-to-one the multiple needle valves and houses one-to-one the multiple drivers; and a positional restraint member that is sheet-shaped, the positional restraint member having flexibility in a direction in which the multiple needle valves each moves for separation or contact, the positional restraint member including: multiple inner circumferences fitting one-to-one respective outer circumferences of the multiple needle valves, and a rim secured to the housing, the positional restraint member restricting a position of each of the multiple needle valves in a transverse direction orthogonal to the discharge direction in which the needle valve moves for separation or contact, in which each of the multiple needle valves is supported in the corresponding housing chamber through the positional restraint member.

Aspect 14

According to Aspect 14, a liquid discharge unit includes: the liquid discharge head of any of Aspects 1 to 13; and a driving controller (e.g., a head controller 902) configured to control driving of the driver (e.g., a piezoelectric element 132).

Aspect 15

According to Aspect 15, a liquid discharge apparatus includes the liquid discharge head of any of Aspects 1 to 13.

Aspect 16

According to Aspect 16, a liquid discharge apparatus includes the liquid discharge unit of Aspect 14.

According to the present embodiment, a needle valve can be inhibited from positional misalignment or from slanting with respect to a nozzle hole, leading to obtainment of reliable liquid discharging.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A liquid discharge head comprising:

a nozzle hole from which a liquid is dischargeable in a discharge direction;

a liquid chamber in communication with the nozzle hole;

a needle valve movable in the discharge direction to be separatable from or contactable with the nozzle hole to open or close the nozzle hole;

a driver to move the needle valve in the discharge direction;

a housing having:

the liquid chamber; and a housing chamber housing the needle valve and the driver;

a sheet member having a shape of a sheet and a flexibility to deform in the discharge direction, the sheet member including:
an inner circumference fitted to an outer circumference of the needle valve; and
a rim secured to the housing, and
a press member, wherein
the sheet member is between the needle valve and the housing in a transverse direction orthogonal to the discharge direction to restrict a position of the needle valve in the transverse direction,
the whole of the sheet member is disposed inside the housing chamber, and
the press member presses the rim of the sheet member to an inner wall of the housing chamber in a direction opposite to the discharge direction to secure the rim of the sheet member.

2. The liquid discharge head according to claim 1, wherein the sheet member is between the liquid chamber and the housing chamber to seal the housing chamber from the liquid in the liquid chamber.

3. The liquid discharge head according to claim 2, wherein the sheet member has a corrugated cross section ranging from the inner circumference to the rim.

4. The liquid discharge head according to claim 1, further comprising:
a bearing between the needle valve and the housing in the transverse direction, and separated from the sheet member in the discharge direction opposite to the liquid chamber across the sheet member,
wherein the bearing restricts the position of the needle valve in the transverse direction.

5. The liquid discharge head according to claim 1, further comprising:
another sheet member having a shape of a sheet and a flexibility to deform in the discharge direction, wherein
said another sheet member is between the needle valve and the housing in the transverse direction, and is separated from the sheet member in the discharge direction opposite to the liquid chamber across the sheet member, and
said another sheet member restricts the position of the needle valve in the transverse direction.

6. The liquid discharge head according to claim 5, wherein said another sheet member absorbs displacement of the needle valve in the transverse direction in response to the needle valve contacting the nozzle hole to close the nozzle hole.

7. The liquid discharge head according to claim 5, wherein the other sheet member includes:
an inner circumference fitted to the outer circumference of the needle valve;
a rim secured to the housing; and
a beam partially coupling the inner circumference and the rim.

8. The liquid discharge head according to claim 1, further comprising:
a sealing member between the liquid chamber and the sheet member in the discharge direction, wherein
the sealing member has a shape of a sheet and a flexibility to deform in the discharge direction, to prevent the liquid entering from the liquid chamber to the housing, and
the sealing member includes:
an inner circumference fitted to the outer circumference of the needle valve; and
a rim secured to the housing.

9. The liquid discharge head according to claim 8, wherein
the sealing member has a sealing portion facing the liquid chamber, the sealing portion having a first area,
the sheet member has a flexible portion flexible in the discharge direction, the flexible portion having a second area, and
the first area of the sealing portion is smaller than the second area of the flexible portion.

10. The liquid discharge head according to claim 8, wherein the sealing member has a corrugated cross section ranging from the inner circumference to the rim.

11. The liquid discharge head according to claim 1, wherein the sheet member includes:
a fiber layer; and
a resin layer on the fiber layer, the resin layer including at least one of resin or rubber.

12. The liquid discharge head according to claim 1, wherein
the sheet member includes:
a metal layer, and
a resin layer on the metal layer, the resin layer including at least one of resin or rubber, and
the metal layer includes:
the inner circumference;
the rim; and
a beam partially coupling the inner circumference and the rim.

13. The liquid discharge head according to claim 1, wherein
the sheet member includes multiple resin layers each including at least one of resin or rubber, and
one of the multiple resin layers includes a beam partially coupling the inner circumference and the rim.

14. The liquid discharge head according to claim 1, further comprising:
multiple nozzle holes having the nozzle hole;
multiple liquid chambers having the liquid chamber, the multiple liquid chambers respectively in communication with the multiple nozzle holes;
multiple needle valves including the needle valve, the multiple needle valves respectively open or close the multiple nozzle holes;
multiple drivers including the driver to respectively move the multiple needle valves in the discharge direction; and
multiple press members including the press member, wherein
the housing includes:
the multiple liquid chambers; and
multiple housing chambers including the housing chamber, the multiple housing chambers respectively housing the multiple needle valves and the multiple drivers;
the sheet member includes:
multiple inner circumferences respectively fitted to outer circumferences of the multiple needle valves; and
multiple rims including the rim secured to the housing; and
the multiple press members press the multiple rims to the inner walls of the housing chambers in the direction opposite to the discharge direction to secure the multiple rims.

15. A liquid discharge unit comprising:
the liquid discharge head according to claim 1; and
circuitry configured to control the driver.

16. A liquid discharge apparatus comprising the liquid discharge unit according to claim 15.

17. A liquid discharge apparatus comprising the liquid discharge head according to claim 1.

18. The liquid discharge head according to claim 1, wherein the housing includes a third housing, a second housing, and a first housing in this order beginning from a side of the housing closest to the nozzle hole, and the sheet member is secured between the second housing and the third housing.

19. The liquid discharge head according to claim 18, wherein the press member contacts the third housing.

20. The liquid discharge head according to claim 1, wherein the housing includes a third housing, a second housing, and a first housing in this order beginning from a side of the housing closest to the nozzle hole, and the press member contacts the third housing.

* * * * *